(12) United States Patent
Vastare et al.

(10) Patent No.: US 12,532,103 B2
(45) Date of Patent: Jan. 20, 2026

(54) CONTEXT-BASED USER AVAILABILITY FOR NOTIFICATIONS

(71) Applicant: Starkey Laboratories, Inc., Eden Prairie, MN (US)

(72) Inventors: Krishna Vastare, Eden Prairie, MN (US); Nitzan Bornstein, Tel Aviv (IL); Majd Srour, San Jose, CA (US); Gal Davidson, Gan Yavne (IL); Amit Shahar, Hod Hasharon (IL)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/571,097

(22) PCT Filed: Jul. 6, 2022

(86) PCT No.: PCT/US2022/073452
§ 371 (c)(1),
(2) Date: Dec. 15, 2023

(87) PCT Pub. No.: WO2023/283569
PCT Pub. Date: Jan. 12, 2023

(65) Prior Publication Data
US 2024/0284085 A1 Aug. 22, 2024

Related U.S. Application Data

(60) Provisional application No. 63/218,735, filed on Jul. 6, 2021.

(51) Int. Cl.
*H04R 1/10* (2006.01)
*H04M 1/72409* (2021.01)

(52) U.S. Cl.
CPC .... *H04R 1/1041* (2013.01); *H04M 1/724097* (2022.02)

(58) Field of Classification Search
CPC .......... H04R 1/1041; H04R 2225/61; H04R 25/558; H04R 2225/41; H04R 2225/55; H04M 1/724097; H04M 1/72454

See application file for complete search history.

(56) References Cited

U.S. PATENT DOCUMENTS

| | | |
|---|---|---|
| 7,458,080 B2 | 11/2008 | Parker et al. |
| 7,660,426 B2 | 2/2010 | Hannibal et al. |

(Continued)

FOREIGN PATENT DOCUMENTS

| | | |
|---|---|---|
| EP | 2908550 B1 | 8/2015 |
| EP | 4171060 A1 | 4/2023 |

(Continued)

OTHER PUBLICATIONS

"Contextual System Event Trigger", Tizen Docs, Retrieved from: https://docs.tizen.org/application/native/guides/alarm/trigger/, Accessed on: Jan. 12, 2022, 12 pp.

(Continued)

*Primary Examiner* — Adnan Aziz
(74) *Attorney, Agent, or Firm* — Shumaker & Sieffert, P.A.

(57) ABSTRACT

One or more processing circuits may obtain sensor data that includes first sensor data generated by a first plurality of sensors of one or more hearing instruments worn by a user and second sensor data generated by a second plurality of sensors of the computing device communicably coupled to the one or more hearing instruments. The one or more processing circuits may generate a notification and may determine, based on at least a portion of the sensor data, a time period at which the user is available to interact with the notification. The one or more processing circuits may, in (Continued)

response to determining the time period at which the user is available to interact with the notification, output, during the time period, the notification.

16 Claims, 8 Drawing Sheets

(56) References Cited

U.S. PATENT DOCUMENTS

| | | | |
|---|---|---|---|
| 8,839,273 | B2 | 9/2014 | Parker et al. |
| 9,596,551 | B2 | 3/2017 | Pedersen et al. |
| 9,603,123 | B1 | 3/2017 | Jackson et al. |
| 9,808,404 | B2 | 11/2017 | Nolan et al. |
| 9,860,653 | B2 | 1/2018 | Olsen et al. |
| 9,891,963 | B2 | 2/2018 | Parker et al. |
| 10,051,109 | B2 | 8/2018 | Jackson et al. |
| 10,491,741 | B2 | 11/2019 | Jackson et al. |
| 10,609,207 | B2 | 3/2020 | Jackson et al. |
| 10,755,717 | B2 | 8/2020 | Werner et al. |
| 10,764,226 | B2 | 9/2020 | Goldstein |
| 10,897,641 | B2 | 1/2021 | Ott et al. |
| 11,638,563 | B2 | 5/2023 | Burwinkel et al. |
| 2006/0222194 | A1 | 10/2006 | Bramslow et al. |
| 2013/0316744 | A1* | 11/2013 | Newham ........... H04M 1/72454 455/458 |
| 2014/0128032 | A1* | 5/2014 | Muthukumar .... H04W 52/0254 455/412.2 |
| 2016/0309266 | A1 | 10/2016 | Olsen et al. |
| 2018/0070155 | A1 | 3/2018 | Negi et al. |
| 2018/0091886 | A1* | 3/2018 | Liu ....................... G10K 11/178 |
| 2018/0176885 | A1 | 6/2018 | Vanblon et al. |
| 2018/0228404 | A1 | 8/2018 | Bhunia et al. |
| 2018/0233018 | A1 | 8/2018 | Burwinkel et al. |
| 2018/0343338 | A1 | 11/2018 | Prasad et al. |
| 2019/0228766 | A1 | 7/2019 | White et al. |
| 2019/0246216 | A1 | 8/2019 | Frederiksen et al. |
| 2019/0253812 | A1 | 8/2019 | Gallégo |
| 2020/0066264 | A1 | 2/2020 | Kwatra et al. |
| 2020/0160277 | A1 | 5/2020 | Weldemariam et al. |
| 2020/0245938 | A1 | 8/2020 | Xu et al. |
| 2021/0099813 | A1* | 4/2021 | Spieler ................. H04R 25/554 |
| 2021/0217532 | A1* | 7/2021 | Heimerl ................. A61B 5/165 |
| 2022/0070585 | A1* | 3/2022 | Chen .................... H04R 1/1041 |
| 2022/0100590 | A1* | 3/2022 | Chalmers ................ H04W 4/12 |
| 2022/0224789 | A1* | 7/2022 | Abdollahian ......... G06F 3/0482 |
| 2022/0225887 | A1* | 7/2022 | Goldman ............. A61B 5/6898 |
| 2023/0041690 | A1* | 2/2023 | Huang ............... G06Q 10/1097 |
| 2023/0164475 | A1 | 5/2023 | Chen et al. |
| 2023/0251712 | A1* | 8/2023 | Fortin ..................... G06F 3/013 345/156 |
| 2023/0396941 | A1 | 12/2023 | Sturgeon et al. |
| 2023/0404490 | A1 | 12/2023 | Burwinkel et al. |

FOREIGN PATENT DOCUMENTS

| | | | |
|---|---|---|---|
| WO | 2010049543 | A2 | 5/2010 |
| WO | 2012149955 | A1 | 8/2012 |
| WO | 2016102416 | A1 | 6/2016 |
| WO | 2019143499 | A1 | 7/2019 |
| WO | 2021108425 | A1 | 6/2021 |
| WO | 2022002110 | A1 | 1/2022 |
| WO | 2023283569 | A1 | 1/2023 |
| WO | 2023028122 | A1 | 3/2023 |

OTHER PUBLICATIONS

"WIDEX Moment™ delivers pure, undistorted, natural sound. So you can better connect with the world around you.", WIDEX, Retrieved from: https://www.widex.com/en-us/hearing-aids/moment/, Accessed on: Mar. 24, 2021, 33 pp.

Guiry et al., "Multi-Sensor Fusion for Enhanced Contextual Awareness of Everyday Activities with Ubiquitous Devices", Sensors, Mar. 21, 2014, 15 pp.

International Preliminary Report on Patentability from International Application No. PCT/US2022/073452 dated Jan. 18, 2024, 10 pp.

International Search Report and Written Opinion of International Application No. PCT/US2022/073452 dated Oct. 20, 2022, 13 pp.

Townend et al., "Real-life Applications of Machine Learning in Hearing Aids", Hearing Review, Mar. 26, 2018, 10 pp.

Wang et al., "Context Recognition for Adaptive Hearing-Aids", 2015 IEEE 13th International Conference on Industrial Informatics (INDIN), Jul. 22, 2015, pp. 1102-1107.

Zhang et al., "Context-aware Event Type Identification Based on Context Fusion and Joint Learning", 2020 IEEE Fifth International Conference on Data Science in Cyberspace (DSC), Jul. 27, 2020, pp. 105-112.

* cited by examiner

CONTEXT-BASED USER AVAILABILITY FOR NOTIFICATIONS

This application is a national stage application under 35 U.S.C. § 371 of PCT Application No. PCT/US2022/073452, filed Jul. 6, 2022, which claims the benefit of U.S. Provisional Application No. 63/218,735, filed Jul. 6, 2021, the entire content of both of which are incorporated herein by reference.

TECHNICAL FIELD

This disclosure relates to context-based notifications.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond just environmental sound-amplification. For example, some modern hearing instruments include advanced audio processing for improved functionality, controlling and programming the bearing instruments, wireless communication with external devices including other hearing instruments (e.g., for streaming media), and so on.

SUMMARY

This disclosure describes techniques for determining the context of a user that wears one or more hearing instruments to determine the availability of the user for receiving a notification. A computing device communicably coupled to the one or more hearing instruments, such as via a wireless connection, may receive sensor data produced by sensors of the one or more hearing instruments and/or the computing device that indicates various information associated with the user, such as the environment that the user is in, the user's activity state, the user's physiological status, and the like. The computing device may monitor the sensor data to continuously determine the user's availability to interact with a notification. When the computing device generates a notification, the computing device may determine a moment at which the user is available to interact with the notification to output the notification, such as by causing the one or more hearing instruments to output the notification.

In one example, this disclosure describes a method comprising: generating, by one or more processing circuits, a notification; obtaining, by the one or more processing circuits, sensor data that includes a set of sensor data generated by a plurality of sensors of one or more hearing instruments worn by a user; determining, by the one or more processing circuits and based on at least a portion of the sensor data, a time period at which the user is available to interact with the notification; and in response to determining the time period at which the user is available to interact with the notification, outputting, by the one or more processing circuits during the time period, the notification.

In another example, this disclosure describes a computing device comprising: memory; and processing circuitry operably coupled to the memory and configured to: generate a notification; obtain sensor data that includes a set of second sensor data generated by a plurality of sensors of one or more hearing instruments worn by a user; determine, based on at least a portion of the sensor data, a time period at which the user is available to interact with the notification; and in response to determining the time period at which the user is available to interact with the notification, outputting, by the one or more processing circuits during the time period, the notification.

In another example, this disclosure describes an apparatus comprising: means for generating a notification; means for obtaining sensor data that includes a set of sensor data generated by a plurality of sensors of one or more hearing instruments worn by a user; means for determining, based on at least a portion of the sensor data, a time period at which the user is available to interact with the notification; and means for, in response to determining the time period at which the user is available to interact with the notification, outputting, during the time period, the notification.

In another example, this disclosure describes a computer-readable medium comprising instructions that, when executed, cause one or more processors to: generate a notification; obtain sensor data that includes a set of sensor data generated by a plurality of sensors of one or more hearing instruments worn by a user; determine, based on at least a portion of the sensor data, a time period at which the user is available to interact with the notification; and in response to determining the time period at which the user is available to interact with the notification, output, during the time period, the notification.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
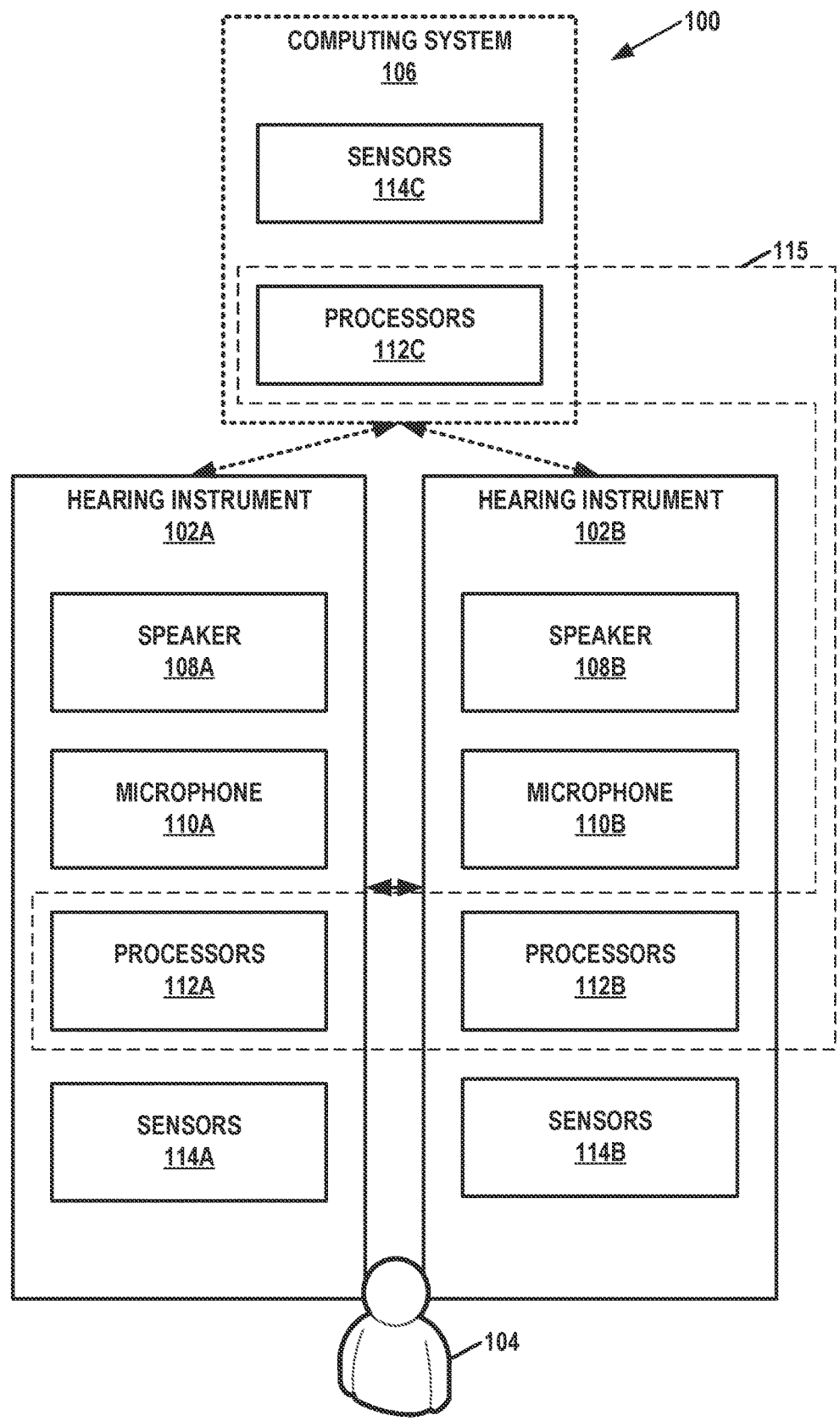
FIG. 1 is a conceptual diagram illustrating an example system that includes one or more hearing instruments, in accordance with one or more techniques of this disclosure.

In general, aspects of the present disclosure describe techniques for determining the context of a user that wears one or more hearing instruments to determine the availability of the user to interact with a notification outputted by the one or more hearing instruments and/or the user's computing device (e.g., the user's smart phone). The context of the user may include information regarding the user's surrounding environment, information regarding the user's physical motion, physiological information regarding the user, and the like. The notifications may include reminders for the user to take an action, such as to stand and stretch, to clean the one or more hearing instruments, to walk the user's dog, to hydrate, and the like.

However, factors such as the environment that the user is in, the user's activity state, the user's physiological status, and the like, may distract the user and cause the user to miss seeing, hearing, or otherwise receiving notifications when such notifications are outputted by the one or more hearing instruments and/or the user's personal computing device (e.g., the user's smart phone). For example, if the user is dancing in a night club to loud music or if the user is exercising, the user may be easily distracted from receiving notifications outputted by the one or more hearing instruments and/or the user's computing device.

Further, if the notification is a reminder for the patient to perform an action, the same factors may make it difficult if not impossible for the user to be able to perform the action even when the user is able to see or hear the notification. For example, if the user receives a notification that is a reminder to walk the user's dog or a reminder to clean the one or more hearing instruments, the user may find it hard or impossible to perform the actions indicated by the notification if the user is not at home.

A user may potentially suffer negative consequences if the user misses receiving notifications or that is unable to perform actions indicated by the notifications. In examples where the notifications are related to the medical treatment or health of the patient, such as notifications that remind the user to take the user's medication or that remind the user to hydrate, missing such notifications or not being able to perform the actions indicated by the notifications may cause the user to suffer negative health consequences.

To overcome these potential issues, aspects of the present disclosure describe techniques for determining moments when the user is available to receive notifications and waiting for those moments when the user is available to receive notifications to output a notification for receipt by the user. In particular, a computing device, such as the user's smart phone, may continuously monitor contextual information associated with the user to determine moments when the user is available to receive notifications. When the computing device generates a notification, the computing device may wait until a moment when the user is available to receive notifications to output the notification.

A computing device may continuously monitor contextual information associated with the user using sensors. For instance, in an example where a user wears one or more hearing instruments, the one or more hearing instruments may include sensors that produce data that indicate contextual information associated with the user, such as information regarding the surrounding environment of the user, information regarding the physical activity that the user is engaged in, physiological information regarding the user, and the like. Because users of hearing instruments may typically wear their hearing instruments from the moment they wake up until bedtime, the user may be highly likely to be wearing the one or more hearing instruments at any time, and thus the sensor information produced by the sensors of the one or more hearing instruments are highly likely to accurately reflect the contextual information of the user.

A computing device may therefore wirelessly communicate with, or be a part of, a user's one or more hearing instruments to continuously receive sensor data produced by the sensors of the user's one or more hearing instruments. When the computing device is not part of the one or more hearing instruments, the computing device may also augment the sensor data produced by the sensors of the user's one or more hearing instruments with sensor data produced by sensors of the computing device. The computing device may therefore use the sensor data received from the one or more hearing instruments as well as the sensor data to continuously determine contextual information associated with the user and to continuously determine, based on the contextual information associated with the user, the availability of the user to interact with a notification.

Because the computing device may continuously determine the availability of the user to interact with a notification, the computing device may generate one or more notifications. When the computing device generates a notification, the computing device may not immediately output the notification if the user is not available to interact with the notification. Instead, the computing device may wait until a moment when the user is available to interact with a notification to output a notification.

The technique of this disclosure provides one or more technical advantages. By monitoring the availability of a user to interact with notifications and by outputting notifications during moments when the user is available to interact with notifications, the techniques of this disclosure improves the functioning of a computer, such as the one or more hearing instruments and/or a smart phone, by enabling the computer to output notifications that are less likely to be missed by the user of the computer.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, user 104 may wear a single hearing instrument. In other instances, user 104 may wear two hearing instruments, with one hearing instrument for each ear of user 104.

Hearing instruments 102 may include one or more of various types of devices that are configured to provide auditory stimuli to user 104 and that are designed for wear and/or implantation at, on, or near an ear of user 104. Hearing instruments 102 may be worn, at least partially, in the ear canal or concha. One or more of hearing instruments 102 may include behind the ear (BTE) components that are worn behind the ears of user 104. In some examples, hearing instruments 102 include devices that are at least partially implanted into or integrated with the skull of user 104. In some examples, one or more of hearing instruments 102 provides auditory stimuli to user 104 via a bone conduction pathway.

In any of the examples of this disclosure, each of hearing instruments 102 may include a hearing assistance device. Hearing assistance devices include devices that help user 104 hear sounds in the environment of user 104. Example types of hearing assistance devices may include hearing aid devices, Personal Sound Amplification Products (PSAPs), cochlear implant systems (which may include cochlear implant magnets, cochlear implant transducers, and cochlear implant processors), bone-anchored or osseointegrated hearing aids, and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the environment of user 104, such as recorded music, computer-generated sounds, or other types of sounds. For instance, hearing instruments 102 may include so-called "hearables," earbuds, earphones, or other types of devices that are worn on or near the ears of user 104. Some types of hearing instruments provide auditory stimuli to user 104 corresponding to sounds from environment of user 104 and also artificial sounds.

In some examples, one or more of bearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of bearing instruments 102 may be behind-the-ear (BTE) devices, which include a housing worn behind the ear that contains all of the electronic components of the hearing instrument, including the receiver (e.g., a speaker). The receiver conducts sound to an earbud inside the ear via an audio tube. In some examples, one or more of hearing instruments 102 are receiver-in-canal (RIC) hearing-assistance devices, which include housings worn behind the ears that contains electronic components and housings worn in the ear canals that contains receivers.

Hearing instruments 102 may implement a variety of features that help user 104 hear better. For example, hearing instruments 102 may amplify the intensity of incoming sound, amplify the intensity of certain frequencies of the incoming sound, translate or compress frequencies of the incoming sound, and/or perform other functions to improve the hearing of user 104. In some examples, hearing instruments 102 implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help user 104 understand conversations occurring in crowds or other noisy environments. In some examples, hearing instruments 102 use beamforming or directional processing cues to implement or augment directional processing modes.

In some examples, hearing instruments 102 reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wireless communication technologies. Example types of wireless communication technology include Near-Field Magnetic Induction (NFMI) technology. 900 MHz technology. BLUETOOTH™ technology, WI-FI™ technology, audible sound signals, ultrasonic communication technology, infrared communication technology, inductive communication technology, or other types of communication that do not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 includes one or more computing devices, each of which may include one or more processors. For instance, computing system 106 may include one or more mobile devices (e.g., smartphones, tablet computers, etc.), server devices, personal computer devices, handheld devices, wireless access points, smart speaker devices, smart televisions, medical alarm devices, smart key fobs, smartwatches, motion or presence sensor devices, wearable devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102.

Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

In the example of FIG. 1, hearing instrument 102A includes a speaker 108A, a microphone 110A, a set of one or more processors 112A, and sensors 114A. Hearing instrument 102B includes a speaker 108B, a microphone 110B, a set of one or more processors 112B, and sensors 114B. This disclosure may refer to speaker 108A and speaker 108B collectively as "speakers 108." This disclosure may refer to microphone 110A and microphone 110B collectively as "microphones 110." Computing system 106 includes a set of one or more processors 112C and sensors 114C. Processors 112C and sensors 114C may each be distributed among one or more devices of computing system 106. This disclosure may refer to processors 112A, 112B, and 112C collectively as "processors 112." Processors 112 may be implemented in circuitry and may include microprocessors, application-specific integrated circuits, digital signal processors, or other types of circuits.

This disclosure may refer to sensors 114A, 114B, and 114C collectively as "sensors 114." Sensors 114 may include one or more input components that obtain environmental information of an environment that includes hearing instruments 102 and computing system 106. Sensors 114 may also include one or more input components that obtain physiological information of user 104. Sensors 114 may also include one or more input components that obtain physical position, movement, and/or location information of bearing instruments 102 and computing system 106.

Sensors 114 may include one or more location sensors, such as one or more satellite-based radio-navigation system sensors, such as a global positioning system (GPS) sensor. In some examples, sensors 114 also include one or more magnetic sensors, telecoils, heart rate sensors, electroencephalogram (EEG) sensors photoplethysmography (PPG) sensors, temperature sensors, or any other sensors for sensing physiological data of user 104. In some examples, sensors 114 may include one or more inertial measurement units that includes one or more accelerometers, gyroscopes, magnetometers, and the like. In some examples, sensors 114 includes microphones such as microphones 110A and 110B.

As noted above, hearing instruments 102A, 102B, and computing system 106 may be configured to communicate with one another. Accordingly, processors 112 may be configured to operate together as a processing system 115. Thus, discussion in this disclosure of actions performed by processing system 115 may be performed by one or more processors in one or more of hearing instrument 102A, hearing instrument 102B, or computing system 106, either separately or in coordination. Moreover, it should be appreciated that, in some examples, processing system 115 does not include each of processors 112A, 112B, or 112C. For instance, processing system 115 may be limited to processors 112A and not processors 112B or 112C.

Figure 2:
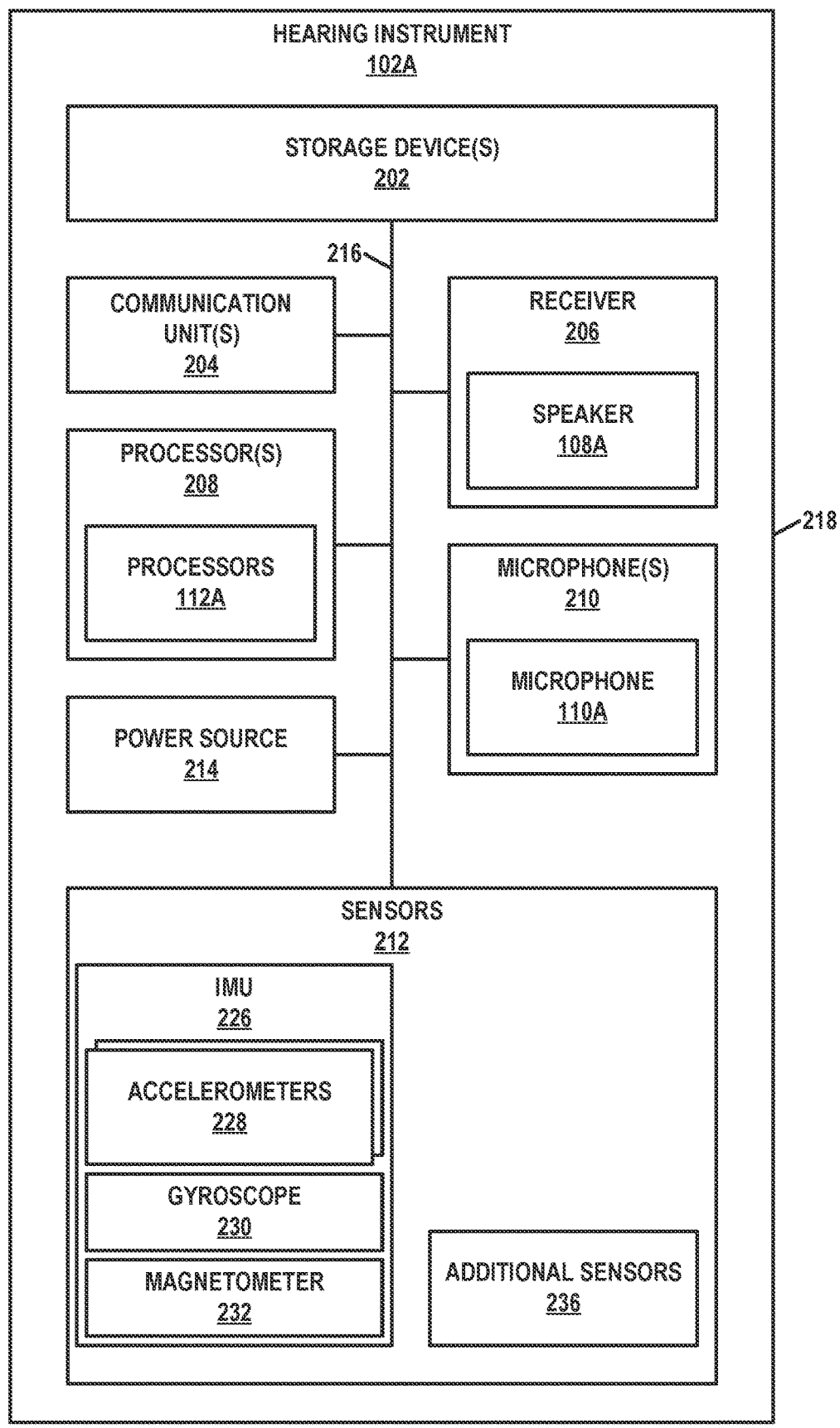
FIG. 2 is a block diagram illustrating example components of a hearing instrument, in accordance with one or more techniques of this disclosure.
Figure 3:
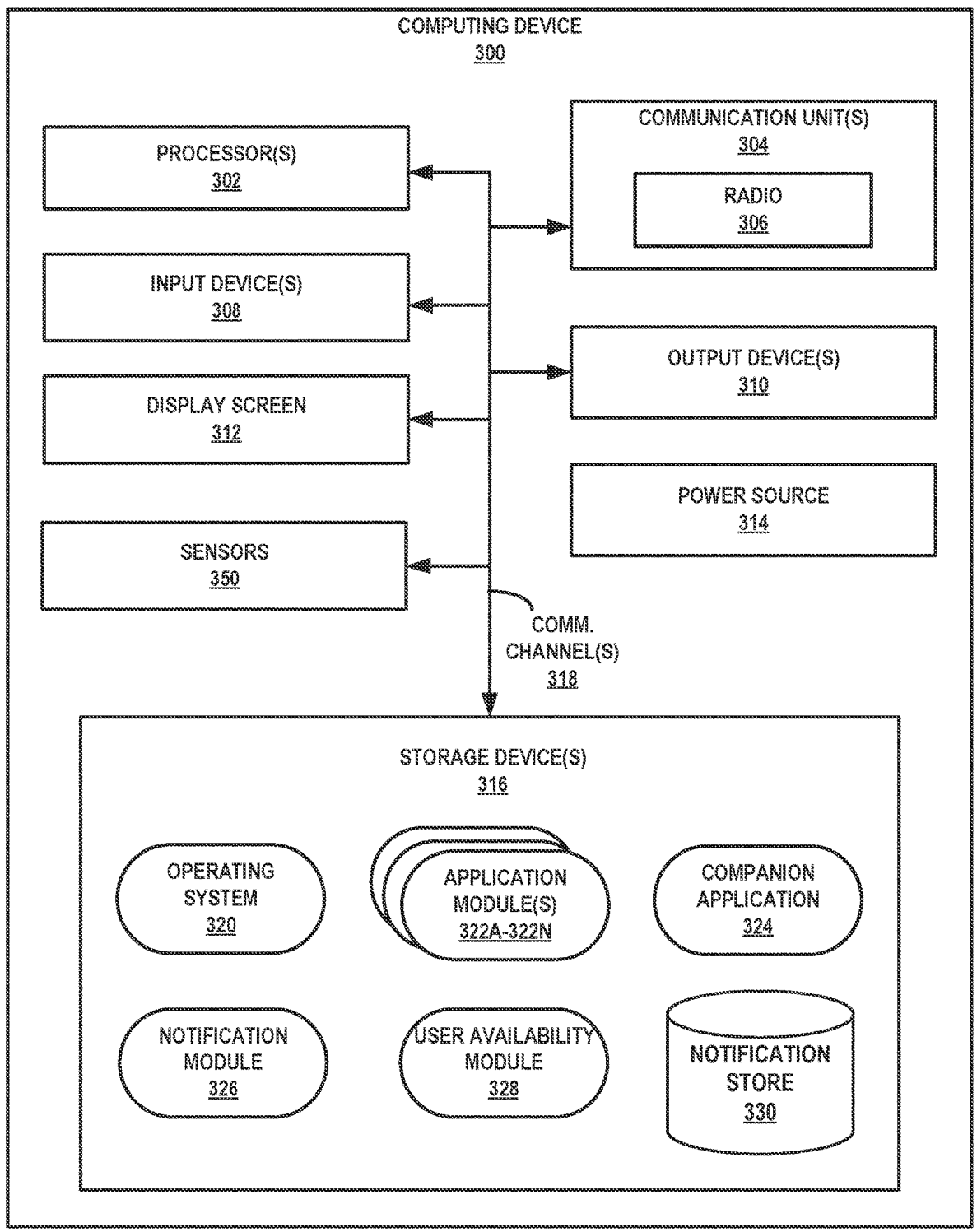
FIG. 3 is a block diagram illustrating example components of a computing device, in accordance with one or more techniques of this disclosure.

It will be appreciated that hearing instruments 102 and computing system 106 may include components in addition to those shown in the example of FIG. 1, e.g., as shown in the examples of FIG. 2 and FIG. 3. For instance, each of hearing instruments 102 may include one or more additional microphones configured to detect sound in an environment of user 104. The additional microphones may include omnidirectional microphones, directional microphones, or other types of microphones.

Hearing instruments 102 and/or computing system 106 may generate a notification. When hearing instruments 102 and/or computing system 106 generate a notification, hearing instruments 102 and/or computing system 106 may process the notification and output the notification, such as by outputting an audible alert indicative of the notification, outputting haptic feedback indicative of the alert, outputting the notification for display at a display device of computing system 106, and the like.

As used throughout the disclosure, the term notification is used to describe various types of information that may indicate the occurrence of an event. For example, a notification may include, but is not limited to, information specifying an event such as the receipt of a communication message (e.g., e-mail, instant message, text message, etc.), a reminder, or any other information that may interest a user. In some examples, the notification may indicate an action to be taken by user 104, such as a notification that reminds user 104 to clean hearing instruments 102 or a notification that reminds user 104 to hydrate (e.g., drink water), a notification that reminds user 104 to take medication, a notification that reminds user 104 to meditate, a notification that reminds user 104 to perform deep breathing, or a notification that reminds user 104 to walk the dog.

However, when hearing instruments 102 and/or computing system 106 generates and outputs a notification, user 104 may be taking part in an activity or may be situated in an environment that may cause user 104 to miss the notification. In addition, when hearing instruments 102 and/or computing system 106 generates and outputs a notification, user 104 may not be available to take action based on the notification when hearing instruments 102 and/or computing system 106 outputs the notification. For example, user 104 may be busy performing other tasks and may miss the notification and/or may be unable to pause their performance of other tasks to view the notification and/or to take action based on the notification. In another example, user 104 may be in a location where it may be difficult for user 104 to take action based on the notification.

As described in greater detail elsewhere in this disclosure, bearing instruments 102 and/or computing system 106 may use sensor data provided by sensors 116 to determine the right moment to output a notification to user 104 so that user 104 is available to receive the notification and/or to take action based on the notification.

When hearing instruments 102 and/or computing system 106 generates a notification, processors 112 may determine whether user 104 is available to interact with the notification. If processors 112 determine that user 104 is available to interact with the notification, processors 112 may output the notification, such as at a display device of one of computing system 106, or as audio output at speakers 108A and/or 108B of hearing instruments 102. If processors 112 determine that user 104 is not available to interact with the notification, processors 112 may wait until user 104 is available to interact with the notification to output the notification. In this way, the techniques of this disclosure may decrease the number of times that user 104 may miss notifications and may increase the effectiveness of notifications, such as reminders, generated by hearing instruments 102 and/or computing system 106.

FIG. 2 is a block diagram illustrating example components of hearing instrument 102A, in accordance with one or more aspects of this disclosure. Hearing instrument 102B may include the same or similar components of hearing instrument 102A shown in the example of FIG. 2. Thus, the discussion of FIG. 2 may apply with respect to hearing instrument 102B. In the example of FIG. 2, hearing instrument 102A includes one or more storage devices 202, one or more communication units 204, a receiver 206, one or more processors 208, one or more microphones 210, a set of sensors 212, a power source 214, and one or more communication channels 216. Communication channels 216 provide communication between storage devices 202, one or more communication units 204, receiver 206, one or more processors 208, one or more microphones 210, and sensors 212. Components 202, 204, 206, 208, 210, 212, and 216 may draw electrical power from power source 214.

In the example of FIG. 2, each of components 202, 204, 206, 208, 210, 212, 214, and 216 are contained within a single housing 218. For instance, in examples where hearing instrument 102A is a BTE device, each of components 202, 204, 206, 208, 210, 212, 214, and 216 may be contained within a behind-the-ear housing. In examples where hearing instrument 102A is an ITE, ITC. CIC, or IIC device, each of components 202, 204, 206, 208, 210, 212, 214, and 216 may be contained within an in-ear housing. However, in other examples of this disclosure, components 202, 204, 206, 208, 210, 212, 214, and 216 are distributed among two or more housings. For instance, in an example where hearing instrument 102A is a RIC device, receiver 206, one or more of microphones 210, and one or more of sensors 212 may be included in an in-ear housing separate from a behind-the-ear housing that contains the remaining components of hearing instrument 102A. In such examples, a RIC cable may connect the two housings. In some examples, sensors 212 are examples of one or more of sensors 114A and 114B of FIG. 1.

Furthermore, in the example of FIG. 2, sensors 212 include an inertial measurement unit (IMU) 226 that is configured to generate data regarding the motion of hearing instrument 102A. IMU 226 may include a set of sensors. For instance, in the example of FIG. 2. IMU 226 includes one or more accelerometers 228, a gyroscope 230, a magnetometer 232, combinations thereof, and/or other sensors for determining the motion of hearing instrument 102A. Furthermore, in the example of FIG. 2, hearing instrument 102A may include one or more additional sensors 236. Additional sensors 236 may include a photoplethysmography (PPG) sensor, blood oximetry sensors, blood pressure sensors, electrocardiogramsors, body temperature sensors, electroencephalography (EEG) sensors, heart rate sensors, environmental temperature sensors, environmental pressure sensors, environmental humidity sensors, skin galvanic response sensors, and/or other types of sensors. In other examples, hearing instrument 102A and sensors 212 may include more, fewer, or different components.

One or more storage devices 202 may store data. One or more storage devices 202 may include volatile memory and may therefore not retain stored contents if powered off. Examples of volatile memories may include random access memories (RAM), dynamic random access memories (DRAM), static random access memories (SRAM), and other forms of volatile memories known in the art. One or more storage devices 202 may include non-volatile memory for long-term storage of information and may retain information after power on/off cycles. Examples of non-volatile memory may include flash memories or forms of electrically programmable memories (EPROM) or electrically erasable and programmable (EEPROM) memories.

One or more communication units 204 may enable hearing instrument 102A to send data to and receive data from one or more other devices, such as a device of computing system 106 (FIG. 1), another hearing instrument (e.g., hearing instrument 102B), an accessory device, a mobile device, or other types of device. One or more communication units 204 may enable hearing instrument 102A to use wireless or non-wireless communication technologies. For instance, one or more communication units 204 enable hearing instrument 102A to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, one or more communication units 204 may enable hearing instrument 102A to communicate using a cable-based technology, such as a Universal Serial Bus (USB) technology.

Receiver 206 includes one or more speakers for generating audible sound. In the example of FIG. 2, receiver 206 includes speaker 108A (FIG. 1). The speakers of receiver 206 may generate sounds that include a range of frequencies. In some examples, the speakers of receiver 206 includes "woofers" and/or "tweeters" that provide additional frequency range.

One or more processors 208 include processing circuits configured to perform various processing activities. One or more processors 208 may process signals generated by one or more microphones 210 to enhance, amplify, or cancel-out particular channels within the incoming sound. One or more processors 208 may then cause receiver 206 to generate sound based on the processed signals. In some examples, one or more processors 208 include one or more digital signal processors (DSPs). In some examples, one or more processors 208 may cause one or more communication units 204 to transmit one or more of various types of data. For example, one or more processors 208 may cause one or more communication units 204 to transmit data such as sensor data produced by one or more of sensors 212, audio data such as audio signals generated by one or more microphones 210 and processed by one or more processors 208, and the like to computing system 106. Furthermore, one or more communication units 204 may receive audio data from computing system 106 and one or more processors 208 may cause receiver 206 to output sound based on the audio data. In the example of FIG. 2, one or more processors 208 include processors 112A (FIG. 1). In some examples, one or more processors 208 may perform one or more aspects of the context-aware notification system.

One or more microphones 210 detect incoming sound and generate one or more electrical signals (e.g., an analog or digital electrical signal) representing the incoming sound. In the example of FIG. 2, microphones 210 include microphone 110A (FIG. 1). In some examples, one or more microphones 210 include directional and/or omnidirectional microphones.

In some examples, one or more processors 208 may send sensor data produced by sensors 212 and/or audio data captured by microphones 210 via one or more communication units 204 to a computing device, such as user 104's smart phone, that is communicably coupled to hearing instrument 102A. For example, one or more processors 208 may continuously stream sensor data, such as sensor data as it is produced by sensors 212 and/or audio data as it is captured by one or more microphones 210 to the computing device.

In some examples, one or more processors 208 may receive, via one or more communication units, indications of notifications from a computing device, such as a smartphone of user 104. One or more processors 208 may, in response to receiving a notification, output the notification, such as by outputting an audio indication of the notification at speaker 108A.

FIG. 3 is a block diagram illustrating example components of computing device 300, in accordance with one or more aspects of this disclosure. FIG. 3 illustrates only one particular example of computing device 300, and many other example configurations of computing device 300 exist. Computing device 300 may be a computing device in computing system 106 (FIG. 1). For example, computing device 300 may be an example of a smart phone that communicates with hearing instruments 102 of FIG. 1.

As shown in the example of FIG. 3, computing device 300 includes one or more processors 302, one or more communication units 304, one or more input devices 308, one or more output devices 310, a display screen 312, a power source 314, one or more storage devices 316, one or more communication channels 318, and sensors 350. Computing device 300 may include other components. For example, computing device 300 may include physical buttons, microphones, speakers, communication ports, and so on. One or more communication channels 318 may interconnect each of components 302, 304, 308, 310, 312, 316, and 350 for inter-component communications (physically, communicatively, and/or operatively). In some examples, one or more communication channels 318 may include a system bus, a network connection, an inter-process communication data structure, or any other method for communicating data. Power source 314 may provide electrical energy to components 302, 304, 308, 310, 312, 316 and 350.

One or more storage devices 316 may store information required for use during operation of computing device 300. In some examples, one or more storage devices 316 have the primary purpose of being a short-term and not a long-term computer-readable storage medium. One or more storage devices 316 may include volatile memory and may therefore not retain stored contents if powered off. In some examples, one or more storage devices 316 includes non-volatile memory that is configured for long-term storage of information and for retaining information after power on/off cycles. In some examples, one or more processors 302 of computing device 300 may read and execute instructions stored by one or more storage devices 316.

Computing device 300 may include one or more input devices 308 that computing device 300 uses to receive user input. Examples of user input include tactile, audio and video user input. One or more input devices 308 may include presence-sensitive screens, touch-sensitive screens, mice, keyboards, voice responsive systems, microphones, motion sensors capable of detecting gestures, or other types of devices for detecting input from a human or machine.

One or more communication units 304 may enable computing device 300 to send data to and receive data from one or more other computing devices (e.g., via a communication network, such as a local area network or the Internet). For instance, one or more communication units 304 may be configured to receive data sent by hearing instruments 102, receive data generated by user 104 of hearing instruments 102, receive and send data, receive and send messages, and so on. In some examples, one or more communication units 304 may include wireless transmitters and receivers that enable computing device 300 to communicate wirelessly with the other computing devices. For instance, in the example of FIG. 3, one or more communication units 304 include a radio 306 that enables computing device 300 to communicate wirelessly with other computing devices, such as bearing instruments 102 (FIG. 1). Examples of one or more communication units 304 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing device 300 may use one or more communication units 304 to communicate with one or more hearing instruments (e.g., hearing instruments 102 (FIG. 1. FIG. 2)). Additionally, computing device 300 may use one or more communication units 304 to communicate with one or more other devices.

One or more output devices 310 may generate output. Examples of output include tactile, audio, and video output. One or more output devices 310 may include presence-sensitive screens, sound cards, video graphics adapter cards, speakers, liquid crystal displays (LCD), light emitting diode (LED) displays, or other types of devices for generating output. One or more output devices may include display screen 312. In some examples, one or more output devices 310 may include virtual reality, augmented reality, or mixed reality display devices.

Sensors 350 may include any input component configured to obtain environmental information about the circumstances surrounding computing device 300, motion information about the activity state of user 104, and/or physiological information that defines the physical well-being of user 104. For instance, sensors 350 may include one or more location sensors (e.g., GPS components, Wi-Fi components, cellular components), one or more temperature sensors, one or more motion sensors (e.g., one or more accelerometers, a gyroscope, a magnetometer, combinations thereof, and/or other sensors for determining the motion of computing device 300), one or more pressure sensors (e.g., barometer), one or more ambient light sensors, and/or any other sensors (e.g., infrared proximity sensor, hygrometer, and the like). Other sensors may include a heart rate sensor, a glucose sensor, a hygrometer sensor, an olfactory sensor, a compass sensor, a step counter sensor, to name a few other non-limiting examples.

One or more processors 302 may read instructions from one or more storage devices 316 and may execute instructions stored by one or more storage devices 316. Execution of the instructions by one or more processors 302 may configure or cause computing device 300 to provide at least some of the functionality ascribed in this disclosure to computing device 300 or components thereof (e.g., one or more processors 302). As shown in the example of FIG. 3, one or more storage devices 316 include computer-readable instructions associated with operating system 320, application modules 322A-322N (collectively, "application modules 322"), companion application 324, notification module 326, and user availability module 328.

Execution of instructions associated with operating system 320 may cause computing device 300 to perform various functions to manage hardware resources of computing device 300 and to provide various common services for other computer programs. Execution of instructions associated with application modules 322 may cause computing device 300 to provide one or more of various applications (e.g., "apps." operating system applications, etc.). Application modules 322 may provide applications, such as text messaging (e.g., SMS) applications, instant messaging applications, email applications, social media applications, text composition applications, and so on.

Companion application 324 is an application that may be used to interact with hearing instruments 102, view information about hearing instruments 102, or perform other activities related to hearing instruments 102. Execution of instructions associated with companion application 324 by one or more processors 302 may cause computing device 300 to perform one or more of various functions. For example, execution of instructions associated with companion application 324 may cause computing device 300 to configure one or more communication units 304 to receive data from hearing instruments 102 and use the received data to present data to a user, such as user 104 or a third-party user. In some examples, companion application 324 is an instance of a web application or server application. In some examples, such as examples where computing device 300 is a mobile device or other type of computing device, companion application 324 may be a native application.

User availability module 328 may execute at one or more processors 302 to determine the availability of a user of computing device 300, such as user 104, based on sensor data. Such sensor data may include a set of sensor data produced by sensors 350 and/or a set of sensor data produced by sensors 212 of hearing instruments 102. Sensors 350 and/or sensors 212 of hearing instruments 102 may continuously perform sensing functionalities to produce real-time sensor data and may continuously stream such sets of sensor data to user availability module 328.

For example, the sensor data may include motion data produced by sensors that obtain physical position, movement, and/or location information of hearing instruments 102 and/or computing device 300 such as in the form of multi-axial accelerometer data, multi-axial rotation rate data, gravity forces data, step counter data, and the like. The sensor data may also include environmental data, such as ambient temperature data, ambient light data, ambient air pressure data, ambient relative humidity data, location data (e.g., GPS data), and the like. The sensor data may also include physiological data produced by physiological sensors that obtain physiological information of user 104, such as heart rate data, EEG data, blood oxygen saturation data, user temperature data, and the like. The sensor data may also include audio data produced by sensors that obtain audio and/or acoustical information, such as from audio signals captured by microphones of one or more input devices 308 and/or one or more microphones 210 of hearing instruments 102).

Utilizing sensor data produced by both sensors 350 and sensors 212 of hearing instruments 102 may provide a technical advantage of providing a greater amount of information to user availability module 328 to determine the availability of user 104. For example, sensors 212 of hearing instruments 102 may include physiological sensors that obtain physiological information of user 104 while sensors 350 of computing device 300. Conversely, sensors 350 of computing device 300 may include one or more location sensors, such as GPS sensors, for producing location data regarding user 104 while sensors 212 of hearing instruments 102 may not include such location sensors.

In addition, because hearing instruments 102 may typically be worn by user 104 throughout the day when user 104 is awake, sensors 212 of hearing instruments 102 may provide sensor data regarding user 104 that is highly likely to accurately represent the surrounding environment of user 104, user 104's activity levels, and user 104's physiological state. Meanwhile, because computing device 300 may not necessarily be on or near user 104 at all times, sensors 350 of computing device 300 may not necessarily provide sensor data that accurately represents the surrounding environment of user 104, user 104's activity levels, and user 104's physiological state. In fact, user availability module 328 may use the sensor data produced by sensors 212 of hearing instruments 102 to determine the accuracy of the sensor data produced by sensors 350, as described in more detail below.

User availability module 328 may execute at one or more processors 302 to determine, based at least in part on the sensor data produced by sensors 350 and/or sensor data produced by sensors 212 of hearing instruments 102, one or more contextual information associated with user 104. In some examples, user availability module 328 may execute at one or more processors 302 to determine contextual information associated with the surrounding environment of user 104. For example, user availability module 328 may execute at one or more processors 302 to determine, based on the location data included in the sensor data, the location of user 104, the date and time, and the like.

User availability module 328 may also execute at one or more processors 302 to determine contextual information associated with the surrounding environment of user 104 based on audio data included in the sensor data. For example, user availability module 328 may also execute at one or more processors 302 to perform acoustic sound classification of audio data included in the sensor data to classify one or more sounds in the audio data in the environment of user 104.

For example, user availability module 328 may classify the one or more sounds in the audio data as specific sounds or ambient noises. Specific sounds may include, for example, human voices, such as vocal speech or utterances from user 104 or vocal speech or utterances from a third party, noise produced by user 104 interacting with objects, such as noise from user 104 chopping vegetables, audio produced by hearing instruments 102 and/or computing device 300, and the like. Ambient noises, such as ambient background noises, may include noise from vehicular traffic, noise from riding in a car, noise from riding in a train, music, background conversations, noise from a nearby television, and the like.

User availability module 328 may also execute at one or more processors 302 to determine contextual information associated with the physical activity and/or motion of user 104. For example, user availability module 328 may execute at one or more processors 302 to determine, based on the motion data included in the sensor data, contextual information such as a physical activity in which user 104 is taking part, whether user 104 is running or walking, whether user 104 is still or moving, whether user 104 is sitting down or standing up, the physical exertion level of user 104, and the like.

User availability module 328 may also execute at one or more processors 302 to determine contextual information associated with the physiological state of user 104. For example, user availability module 328 may execute at one or more processors 302 to determine, based on the physiological data included in the sensor data, vitality information associated with user 104, such as the blood oxygen saturation level of user 104, the brain activity of user 104, the internal temperature of user 104, and the like.

In some instances, user availability module 328 may not use all of the sensor data produced by sensors 350 and/or sensors 212 of hearing instruments 102 to determine contextual information associated with user 104. Instead, user availability module 328 may determine whether to refrain from using a portion of sensor data produced by sensors 350 and/or sensors 212 of hearing instruments 102 to determine contextual information associated with user 104.

In some examples, user availability module 328 may refrain from using sensor data that do not reflect an accurate indication of user 104's surroundings, the activity state of user 104, and/or the physical well-being of user 104. Because hearing instruments 102 may be worn by user 104 for a significant amount of user 104's day, user availability module 328 may make an assumption that sensor data produced by sensors 212 of hearing instruments 102 accurately indicates user 104's surroundings, the activity state of user 104, and/or the physical well-being of user 104. User availability module 328 may therefore compare sensor data produced by sensors 350 with corresponding sensor data produced by sensors 212 of hearing instruments 102 to determine whether sensor data produced by sensors 350 accurately indicates user 104's surroundings, the activity state of user 104, and/or the physical well-being of user 104. If user availability module 328 determines that sensor data produced by sensors 350 do not accurately indicate user 104's surroundings, the activity state of user 104, and/or the physical well-being of user 104, user availability module 328 may refrain from using one or more of the sensor data produced by sensors 350 to determine contextual information associated with user 104.

Because hearing instruments 102 are worn by user 104, the values of one or more of the sensor data produced by sensors 350 not matching values of a corresponding one or more of the sensor data produced by sensors 212 of hearing instruments 102 may indicate that computing device 300 is not being worn or carried by user 104 and/or that computing device 300 is not within the vicinity (e.g., within a few feet) of user 104. Computing device 300 not being worn or carried by user 104 and/or not being within the vicinity of user 104 may cause sensors 350 to produce inaccurate sensor data regarding the motion of user 104 and/or the surrounding environment of user 104, and using such inaccurate sensor data to determine contextual information associated with user 104 may cause user availability module 328 to determine contextual information associated with user 104 that is inaccurate.

User availability module 328 may execute at one or more processors 302 to determine whether the values of one or more of the sensor data produced by sensors 350 match the values of a corresponding one or more sensor data produced by sensors 212 of hearing instruments 102, and may refrain from using sensor data produced by sensors 350 to determine contextual information associated with user 104 if user availability module 328 determines that the values of the one or more of the sensor data produced by sensors 350 do not match the values of the corresponding one or more of the sensor data produced by sensors 212 of hearing instruments 102.

The value of a sensor data produced by sensors 350 may match the value of a corresponding sensor data produced by sensors 212 of hearing instruments 102 if the difference between the two values are within (e.g., less than or equal to) a threshold, which may be a percentage of the values such as 5%, 10%, and the like. For example, user availability module 328 may execute at one or more processors 302 to determine whether the values of the sensor data produced by a step counter of sensors 350 matches the values of the sensor data produced by a step counter of sensors 212 of hearing instruments 102. If user availability module 328 determines that the values of the sensor data produced by a step counter of sensors 350 do not match the values of the sensor data produced by a step counter of sensors 212 of hearing instruments 102, user availability module 328 may determine that sensors 350 are producing inaccurate sensor data regarding the motion of user 104 and may refrain from using sensor data produced by sensors 350 to determine contextual information associated with user 104.

In another example, user availability module 328 may execute at one or more processors 302 to determine whether the values of the audio data produced by microphones of one or more input devices 308 matches the values of the audio data produced by one or more microphones 210 of hearing instruments 102. If user availability module 328 determines that the values of the audio data produced by microphones of one or more input devices 308 do not match the values of the audio data produced by one or more microphones 210 of hearing instruments 102, user availability module 328 may determine that microphones of one or more input devices 308 are producing inaccurate audio data regarding the surrounding environment of user 104 and may refrain from using sensor data produced by sensors 350 to determine contextual information associated with user 104.

User availability module 328 may execute at one or more processors 302 to continuously determine contextual information associated with user 104 based on the sensor data streamed from sensors 350 and/or sensors 212 of hearing instruments 102 to identify a time period where user 104 is available to interact with a notification outputted by computing device 300 and/or hearing instruments 102. The time period may be a very brief period of time, such as less than one second, one second, three seconds, five seconds, etc., where user 104 is likely (e.g., above a likelihood threshold) to paying attention to the notification and/or to take an action associated with the notification.

User availability module 328 may execute at one or more processors 302 to determine, based at least in part on contextual information associated with user 104 for a time period, an availability state of user 104 at the time period to interact with a notification. In some examples, user availability module 328 may execute at one or more processors 302 to classify the availability state of user 104 based at least in part on the contextual information, as either available or not available. If user availability module 328 classifies the availability state is available, user availability module 248 may determine that user 104 is available at the time period to interact with a notification. If user availability module 328 classifies the availability state is not available, user availability module 248 may determine that user 104 is not available at the time period to interact with a notification.

User availability module 328 may execute at one or more processors 302 to determine, based at least in part on contextual information associated with user 104 during a time period, an availability state of user 104 at the time period to interact with a notification in any suitable manner. User availability module may use one or more of: contextual information associated with the physiological state of user 104 during the time period, contextual information associated with the physical activity and/or motion of user 104 during the time period, and/or contextual information associated with the surrounding environment of user 104 during the time period to determine the availability of user 104 at the time period to interact with a notification.

For example, if the contextual information associated with user 104 during the time period indicates that user 104 is exercising or otherwise physically exerting themself, such as by jogging, lifting weights, and the like, user availability module 328 may determine that user 104 is not available at the time period to interact with a notification. In another example, if the contextual information associated with user 104 during the time period indicates that user 104 is not exercising or otherwise physically exerting themself, user availability module 328 may determine that user 104 is available at the time period to interact with a notification.

In some examples, if the contextual information associated with user 104 indicates that user 104 is asleep, user availability module 328 may determine that user 104 is not available at the time period to interact with a notification. In some examples, if the contextual information associated with user 104 during the time period indicates that user 104 is engaged in conversation with another person, user availability module 328 may determine that user 104 is not available at the time period to interact with a notification regardless of whether user 104 is exercising and regardless of where user 104 is located.

In some examples, if the contextual information associated with user 104 during the time period indicates that user 104 is at user 104's place of work and that user 104 is not in a work-related meeting or otherwise conversing with another person, user availability module 328 may determine that user 104 is available at the time period to interact with a notification. In some examples, if the contextual information associated with user 104 during the time period indicates that user 104 is at a concert hall and is listening to loud music, user availability module 328 may determine that user 104 is not available at the time period to interact with a notification.

Notification module 326 may execute at one or more processors 302 to perform functions associated with receiving, managing, and otherwise handling at least a portion of a notification generated and/or received by platforms, applications, and services executing at, or in communication with, hearing instruments 102 and/or computing device 300. For example, one or more processors 302 may execute notification module 326 to generate notifications and/or receive notifications generated by platforms, applications, and services executing at, or in communication with, hearing instruments 102 and/or computing device 300.

A notification may include, but is not limited to, information specifying an event such as the receipt of a communication message (e.g., e-mail, instant message, text message, etc.), a reminder, or any other information that may interest a user. In some examples, the notification may indicate an action to be taken by user 104, such as a notification that reminds user 104 to clean hearing instruments 102 or a notification that reminds user 104 to hydrate (e.g., drink water), a notification that reminds user 104 to take medication, a notification that reminds user 104 to meditate, a notification that reminds user 104 to perform deep breathing, or a notification that reminds user 104 to walk the dog.

Notification module 326 may, in response to receiving and/or generating a notification, determine a time period where user 104 is available to interact with the notification, and output the notification during a time period where user 104 is available to interact with the notification. That is, notification module 326 may refrain from outputting a notification until the occurrence of a time period where user 104 is available to interact with the notification.

Notification module 326 may execute at one or more processors 302 to continuously communicate with user availability module 328 to receive, from user availability module 328, indications of the availability state of user 104 during each of a plurality of time periods. For example, each time user availability module 328 determines that a time period where user 104 is available to interact with a notification is occurring, user availability module 328 may send an indication of the occurrence of the time period where user 104 is available to interact with a notification. Notification module 326 may, in response to receiving, from user availability module 328, an indication of the occurrence of the time period where user 104 is available to interact with a notification, output the notification during the time period where user 104 is available to interact with a notification, as indicated by user availability module 328. If the notification indicates an action to be performed by user 104, outputting the notification may also include outputting an indication of the action to be performed by user 104.

In some examples, notification module 326 may output a notification for display at display screen 312, such as in the form of an alert, message, a reminder, or other visual indicator that indicates the occurrence of the notification and/or indicates an action to be performed by user 104. For example, notification module 326 may output, for display at display screen 312, a notification that is a reminder for user 104 to take medication by outputting, at display screen 312, a message that reminds user 104 to take medication.

In some examples, notification module 326 may output a notification in audio form for output by an audio output device (e.g., a speaker) of one or more output devices 310. The notification in audio form may, for example, be an audio alert, synthesized speech, and the like that indicates the occurrence of the notification and/or indicates an action to be performed by user 104.

In some examples, in addition to or instead of outputting a notification at computing device 300, notification module 326 may output the notification to hearing instruments 102 via one or more communication units 304. Hearing instruments 102 may, in response to receiving the notification, output the notification at one or more output devices, such as by outputting the notification in audio form at speaker 108A of hearing instruments 102.

As notification module 326 waits for the occurrence of a time period where user 104 is available to interact with the notification to output the notification during the time period, notification module 326 may continue to receive and/or generate additional notifications, and may store such notifications in one or more storage devices 316 until notification module 326 outputs indications of the notifications. Thus, when a time period where user 104 is available to interact with a notification occurs, notification module 326 may have stored a plurality of notifications of which notification module 326 may output indications, and notification module 326 may select a notification out of the plurality of notifications to output during the time period.

Notification module 326 may store, in a notification store 330, notifications received and/or generated by notification module 326 of which notification module 326 have yet to output indications. In some examples, notification module 326 may output the notifications in the notification store 330 in a first-in-first-out manner, so that when a time period where user 104 is available to interact with a notification occurs, notification module 326 may output an indication of the earliest notification in the notification store 330 during the time period. When notification module 326 outputs a notification stored in the notification store 330, notification module 326 may correspondingly remove the notification from the notification store 330.

In some examples, notification module 326 may associate a priority level with each notification received and/or generated by notification module 326, and may order the notifications in the notification store 330 according to the priority level of each notification from the highest priority level to the lowest priority level. When a time period where user 104 is available to interact with a notification occurs, notification module 326 may therefore output the notification having the highest priority level in the notification store 330 during the time period.

For notifications in the notification store 330 associated with the same priority level, notification module 326 may order notifications associated with the same priority level according to the time at which notification module 326 generated or received each of the notifications. As such, when a time period where user 104 is available to interact with a notification occurs, and the notification store 330 contains two or more notifications at the same highest priority level, notification module 326 may output, during the time period, the notification that was received or generated the earliest out of the two or more notifications having the highest priority level in the notification store 330.

In some examples, user availability module 328 may determine whether user 104 is available to interact with the highest priority notification in the notification store 330 based on the action to be performed by user 104 that is indicated with the notification. For example, user availability module 328 may determine, based on sensor data and the contextual information associated with user 104 during a time period, that user 104 is flying in a passenger jet during the time period and thus may be available to interact with a notification. However, if notification module 326 determines that the notification having the highest priority level in the notification store 330 is a reminder for user 104 to walk user 104's dog, user availability module 328 may determine that while user 104 is available to interact with a notification, user 104 may not be available to perform the action indicated in the notification of walking user 104's dog.

In another example, user availability module 328 may determine, based on sensor data and the contextual information associated with user 104 during a time period, that user 104 is in the middle of a meeting at user 104's workplace during the time period and thus may be available to interact with a notification. However, if notification module 326 determines that the notification having the highest priority level in the notification store 330 is a reminder for user 104 to clean hearing instruments 102, user availability module 328 may determine that while user 104 is available to interact with a notification, user 104 may not be available to perform the action indicated in the notification of cleaning hearing instruments 102. As such, because user availability module 328 determines that user 104 is not available during the time period to perform the action indicated by the notification having the highest priority level in the notification store 330, user availability module 328 may indicate that user 104 is not available during the time period to interact with a notification.

In some examples, to prevent a notification in the notification store 330 from remaining in the notification store 330 for an extended amount of time without notification module 326 outputting the notification, notification module 326 may associate each notification with a timeout value. A timeout value associated with a notification may indicate the maximum amount of time (e.g., number of seconds) since the notification was received or generated by notification module 326 that may elapse without notification module 326 outputting the notification. Thus, notification module 326 may, in response to determining that the elapsed time since a notification in the notification store 330 was received or generated by notification module 326 has exceeded a timeout value associated with the notification, output the notification regardless of whether a time period where user 104 is available to interact with a notification is occurring and regardless of whether the notification is associated with a highest priority level compared with other notifications in the notification store 330.

Figure 4:
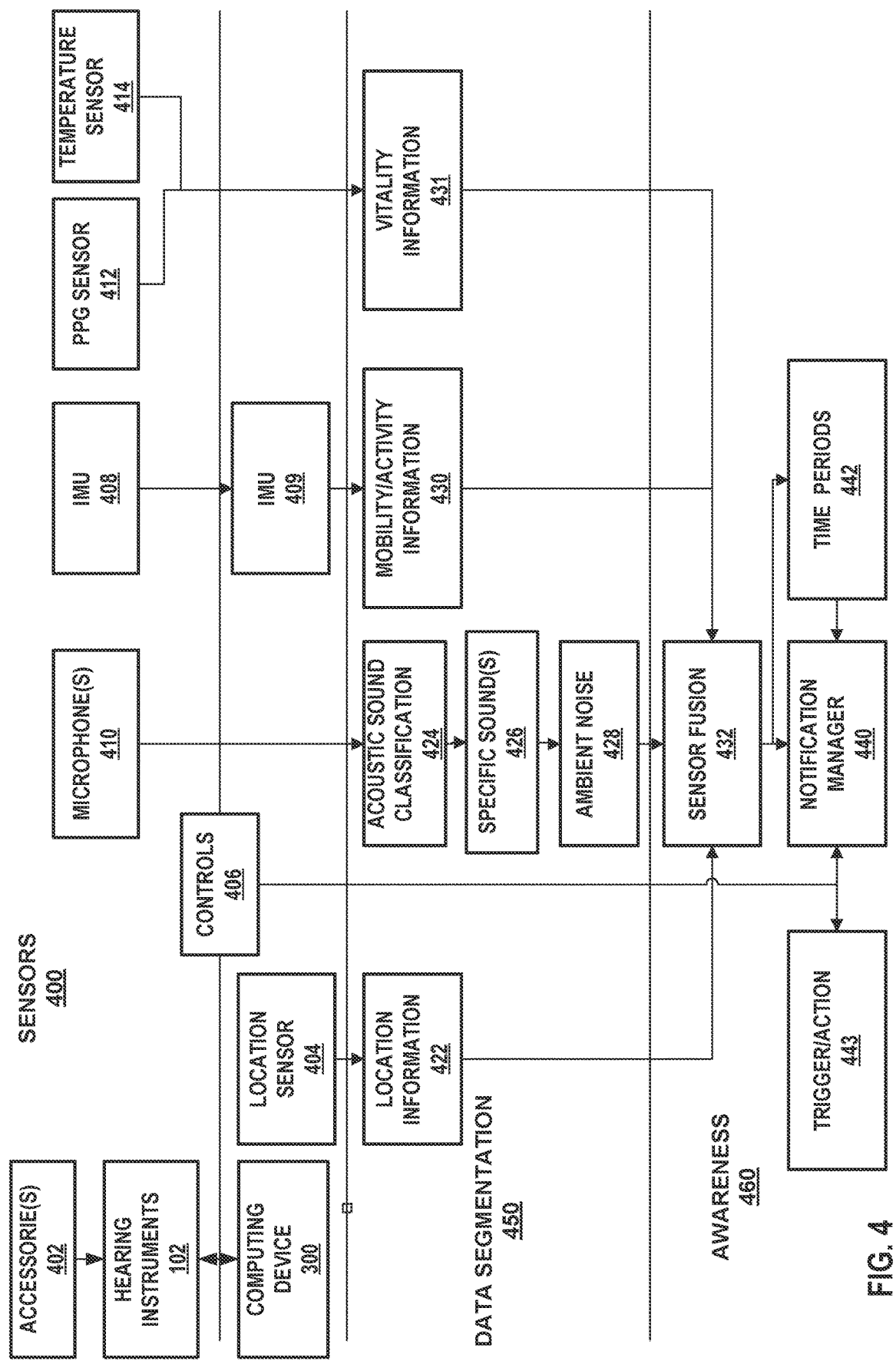
FIG. 4 is a block diagram illustrating an example operation of example hearing instruments and an example computing device to perform the techniques of this disclosure.

FIG. 4 is a block diagram illustrating an example operation of hearing instruments 102 and computing device 300 to perform the techniques of this disclosure. As shown in FIG. 4, hearing instruments 102 may be communicably coupled to computing device 300 and one or more accessories 402, such as a remote microphone, a table microphone, a television audio streamer and the like. Sensors 400 may include sensors of hearing instruments 102 and one or more accessories 402, such as one or more microphones 410, IMUs 408, PPG sensor 412, body temperature sensor 414, and the like. Sensors 400 may also include sensors of computing device 300, such as location sensor 404, IMUs 409, and the like. Sensors 400 may also include controls of hearing instruments 102 and computing device 300, such as buttons, touchscreens, volume controls, and the like.

Sensors 400 may generate and stream sensor data to hearing instruments 102 and/or computing device 300. For example, one or more microphones 410 may continuously capture and stream audio and IMUs 408 and 409 may continuously capture and stream motion data. Hearing instruments 102 and/or computing device 300 may perform data segmentation of the sensor data streamed by sensors 400 to determine various contextual information regarding user 104 and/or the environment surrounding user 104. For example, hearing instruments 102 and/or computing device 300 may determine location information 422 of user 104 based on the sensor data from location sensor 404, mobility and/or activity information 430 of user 104 based on the sensor data from IMUs 408 and 409, and vitality information 431 of user 104 based on the sensor data from PPG sensor 412 and body temperature sensor 414.

Hearing instruments 102 and/or computing device 300 may also receive sensor data, such as audio data, from one or more microphones 410, and may process such audio data, such as by performing acoustic sound classification 424 to classify the audio data, determine one or more specific sounds 426 from the audio data, and/or determine characteristics of ambient noise 428 from the audio data.

Hearing instruments 102 and/or computing device 300 may determine an awareness 460 of the availability of user 104 to interact with a notification by performing sensor fusion 432 of the sensor data received from sensors 400. That is, hearing instruments 102 and/or computing device 300 may utilize sensor data captured by sensors across multiple devices, such as one or more accessories 402, hearing instruments 102 and computing device 300 to determine the availability of user 104 to interact with a notification during time periods 442. Notification manager 440 that executes at hearing instruments 102 and/or computing device 300 may determine, based on the availability of user 104 to interact with a notification during time periods 442, determine a time period at which user 104 is available to interact with a notification to perform an action 443, such as to output a notification at the time period.

Figure 5:
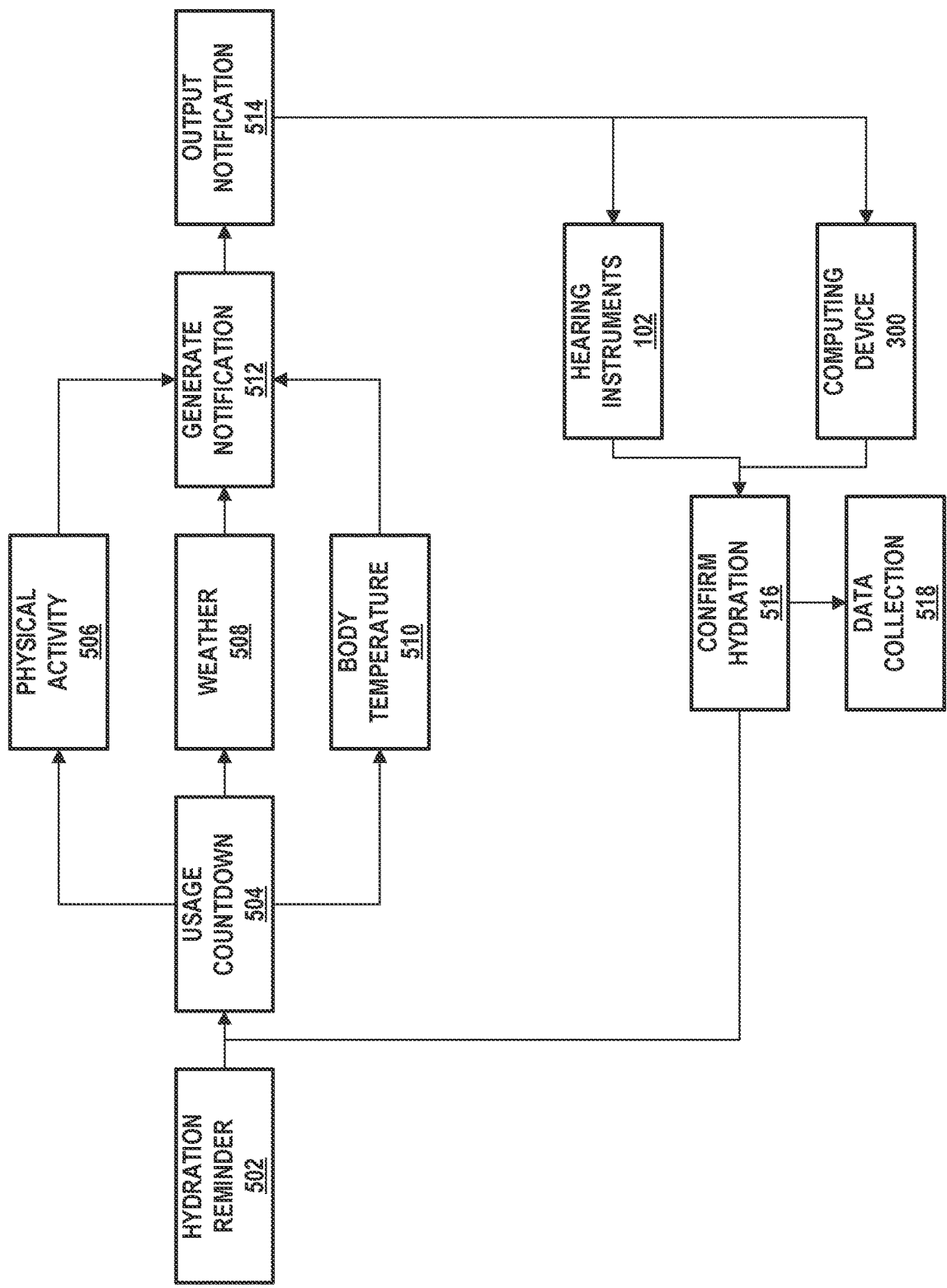
FIG. 5 is a block diagram illustrating an example operation of example hearing instruments and an example computing device to output a reminder for a user to hydrate, in accordance with the techniques of this disclosure.

FIG. 5 is a block diagram illustrating an example operation of hearing instruments 102 and computing device 300 to output a reminder for user 104 to hydrate, in accordance with the techniques of this disclosure. Senior citizens may be at a particularly elevated risk for dehydration due to how body composition changes with age. In addition, water is necessary for nearly every bodily function, from lubricating joints to regulating body temperature and pumping blood to the muscles. As such, not getting enough water can have serious health consequences.

As shown in FIG. 5, user 104 may interact with hearing instruments 102 and/or computing device 300 to set up a hydration reminder (502). User 104 may set up hydration goals, such as the amount (e.g., in liters) of water to consume each day, the amount of motivation needed by user 104 to reach the hydration goal, and the like. Hearing instruments 102 and/or computing device 300 may therefore perform a usage countdown based on the settings of hydration reminder of when to next remind user 104 to hydrate (504). The usage countdown may change, such as speed up or slow down, based on factors such as the intensity of physical activity 506 performed by the user, the current weather 508, the body temperature 510 of user 104, and the like. At the end of the usage countdown, hearing instruments 102 and/or computing device 300 may generate a notification to remind user 104 to hydrate (512). The notification may, for example, indicate the amount of water for user 104 to drink. Hearing instruments 102 and/or computing device 300 may wait until the time period at which user is available to interact with the notification and to hydrate to output the notification (514). Hearing instruments 102 and/or computing device 300 may output the notification at hearing instruments 102 and/or computing device 300.

User 104 may, after receiving the notification and hydrating, interact with hearing instruments 102 and/or computing device 300 to confirm that user 104 has hydrated (516). Hearing instruments 102 and/or computing device 300 may therefore return to performing another usage countdown for the next reminder for user 104 to hydrate (504). Hearing instruments 102 and/or computing device 300 may also perform data collection regarding user 104's hydration habits (518), and may use such collected data to further modify the settings of the hydration reminder or may save such data for future usage.

Figure 6:
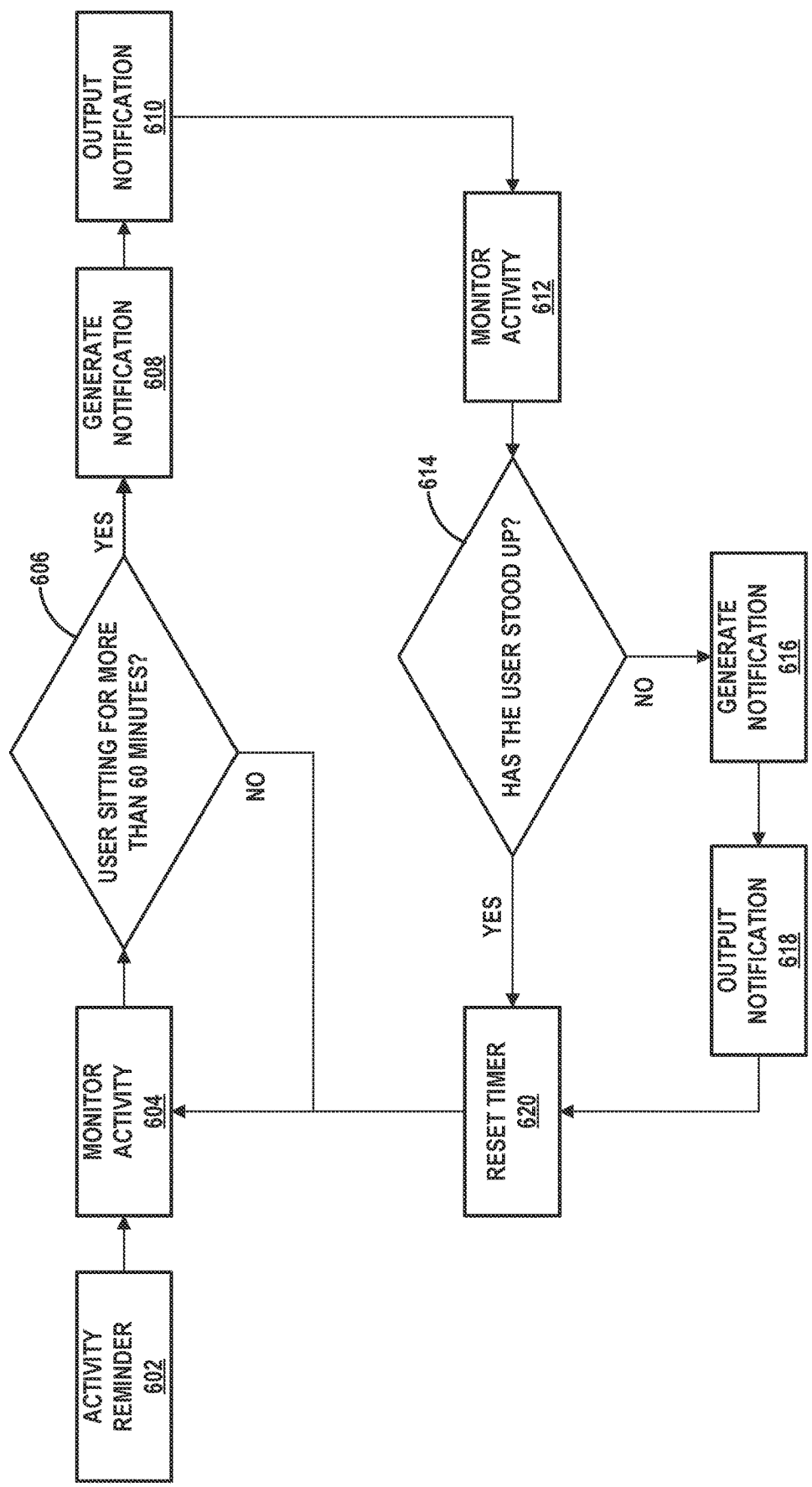
FIG. 6 is a block diagram illustrating an example operation of example hearing instruments and an example computing device to output a reminder for a user to be physically active after a period of being inactive, in accordance with the techniques of this disclosure.

FIG. 6 is a block diagram illustrating an example operation of hearing instruments 102 and computing device 300 to output a reminder for user 104 to be physically active after a period of being inactive, in accordance with the techniques of this disclosure. As shown in FIG. 6, user 104 may interact with hearing instruments 102 and/or computing device 300 to set up an activity reminder to monitor the activity level of user 104 and to remind user 104 to stand up and stretch after a period of sitting (602).

Hearing instruments 102 and/or computing device 300 may use motion sensors, such as IMUs, to monitor the physical activities of user 104 (604). Specifically, hearing instruments 102 and/or computing device 300 may monitor whether user 104 is sitting or standing and may determine whether user 104 has been sitting for more than sixty minutes (606). If user 104 has not been sitting for more than sixty minutes, hearing instruments 102 and/or computing device 300 may return to monitoring the physical activities of user 104 (604).

If user 104 has been sitting for more than sixty minutes, hearing instruments 102 and/or computing device 300 may output a notification to remind user 104 to stand up and stretch (608). The notification may, for example, indicate the amount of water for user 104 to drink. Hearing instruments 102 and/or computing device 300 may wait until the time period at which user is available to interact with the notification and to stand up and stretch to output the notification (610). Hearing instruments 102 and/or computing device 300 may output the notification at hearing instruments 102 and/or computing device 300.

Hearing instruments 102 and/or computing device 300 may, in response to outputting the notification, monitor the physical activity of user 104 to determine whether user 104 has performed the action of standing up and stretching within a period of time, such as fifteen minutes, after the notification was outputted (612). As described above, hearing instruments 102 and/or computing device 300 may use motion sensors, such as IMUs, to determine whether user 104 has performed the action of standing up and stretching. As hearing instruments 102 and/or computing device 300 monitors the physical activity of user 104, hearing instruments 102 and/or computing device 300 may determine, based on the motion data generated by the motion sensors, whether user 104 has performed the action of standing up and stretching within the specified period of time after the notification was outputted (614).

If hearing instruments 102 and/or computing device 300 determines that user 104 has performed the action of standing up and stretching within the specified period of time after the notification was outputted, hearing instruments 102 and/or computing device 300 may reset the timer (660) and may continue to monitor the physical activity of user 104 to determine whether to send another reminder for user 104 to stand up and stretch (604). If hearing instruments 102 and/or computing device 300 determines that user 104 has not performed the action of standing up and stretching within the specified period of time after the notification was outputted, hearing instruments 102 and/or computing device 300 may generate another notification to remind user 104 to stand up and stretch (616). Hearing instruments 102 and/or computing device 300 may wait until the time period at which user is available to interact with the notification and to stand up and stretch to output the notification (618). Hearing instruments 102 and/or computing device 300 may output the notification at hearing instruments 102 and/or computing device 300. Hearing instruments 102 and/or computing device 300 may therefore reset the timer (620) and may continue to monitor the physical activity of user 104 to determine whether to send another reminder for user 104 to stand up and stretch (604).

Figure 7:
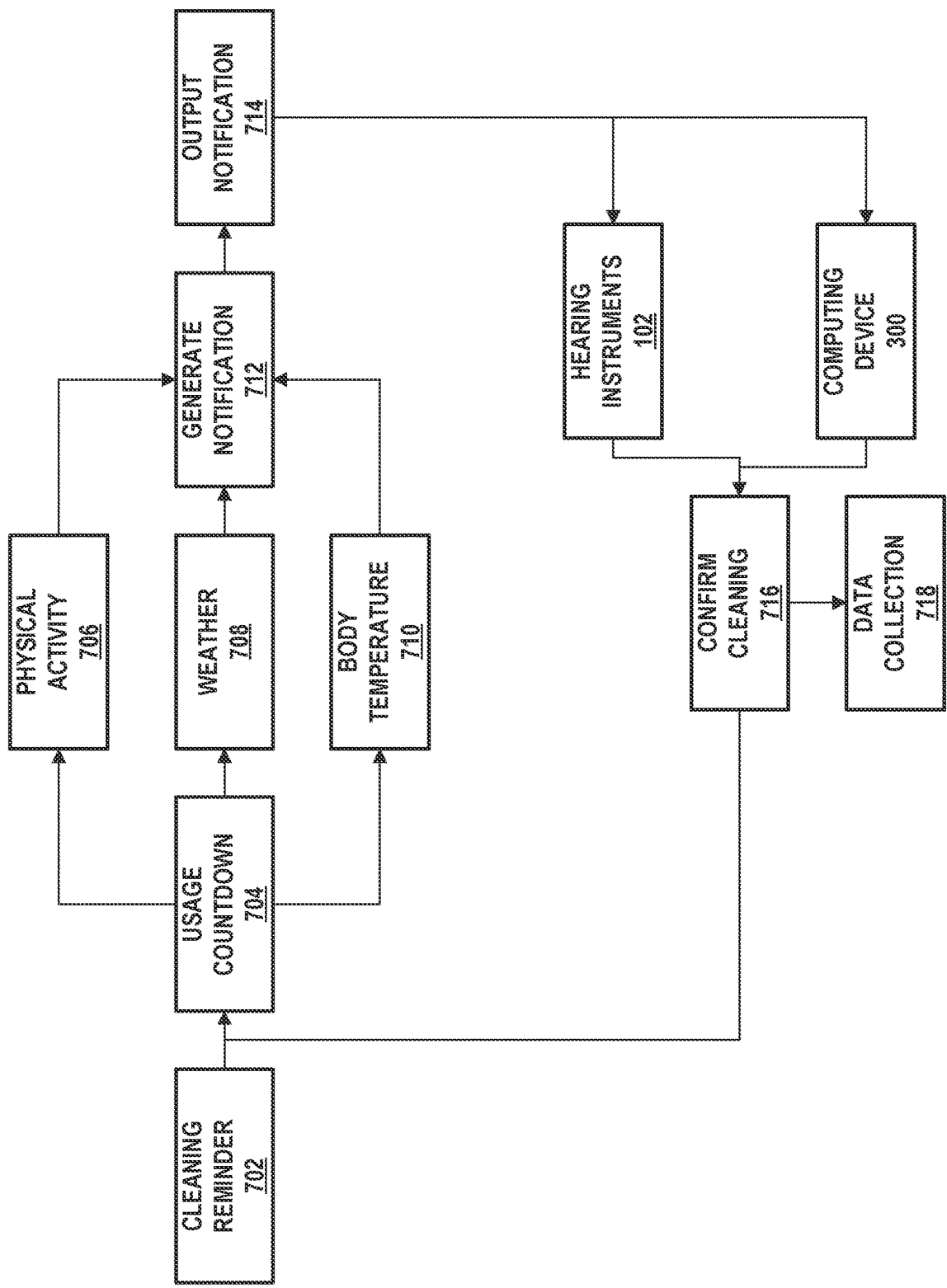
FIG. 7 is a block diagram illustrating an example operation of example hearing instruments and an example computing device to output a reminder for a user to clean the example hearing instruments, in accordance with the techniques of this disclosure.

FIG. 7 is a block diagram illustrating an example operation of bearing instruments 102 and computing device 300 to output a reminder for user 104 to clean hearing instruments 102, in accordance with the techniques of this disclosure. As shown in FIG. 7, user 104 may interact with hearing instruments 102 and/or computing device 300 to set up a cleaning reminder for user 104 to clean hearing instruments 102 (702). User 104 may set up, for example, the amount of earwax build up to warrant a reminder to clean hearing instruments 102. Hearing instruments 102 and/or computing device 300 may therefore perform a usage countdown based on the settings of the cleaning reminder of when to next remind user 104 to clean hearing instruments 102 (704). The usage countdown may change, such as speed up or slow down, based on factors such as the intensity of physical activity 706 performed by the user, the current weather 708, the body temperature 710 of user 104, and the like, which may increase or decrease the amount of earwax to build up on hearing instruments 102. At the end of the usage countdown, hearing instruments 102 and/or computing device 300 may generate a notification to remind user 104 to clean hearing instruments 102 (712) Hearing instruments 102 and/or computing device 300 may wait until the time period at which user is available to interact with the notification and to clean hearing instruments to output the notification (714). Hearing instruments 102 and/or computing device 300 may output the notification at hearing instruments 102 and/or computing device 300.

User 104 may, after receiving the notification and cleaning hearing instruments 102, interact with hearing instruments 102 and/or computing device 300 to confirm that user 104 has cleaned hearing instruments 102 (716). Hearing instruments 102 and/or computing device 300 may therefore return to performing another usage countdown for the next reminder for user 104 to clean hearing instruments 102 (704). Hearing instruments 102 and/or computing device 300 may also perform data collection regarding user 104's cleaning habits (718), and may use such collected data to further modify the settings of the cleaning reminder or may save such data for future usage.

Figure 8:
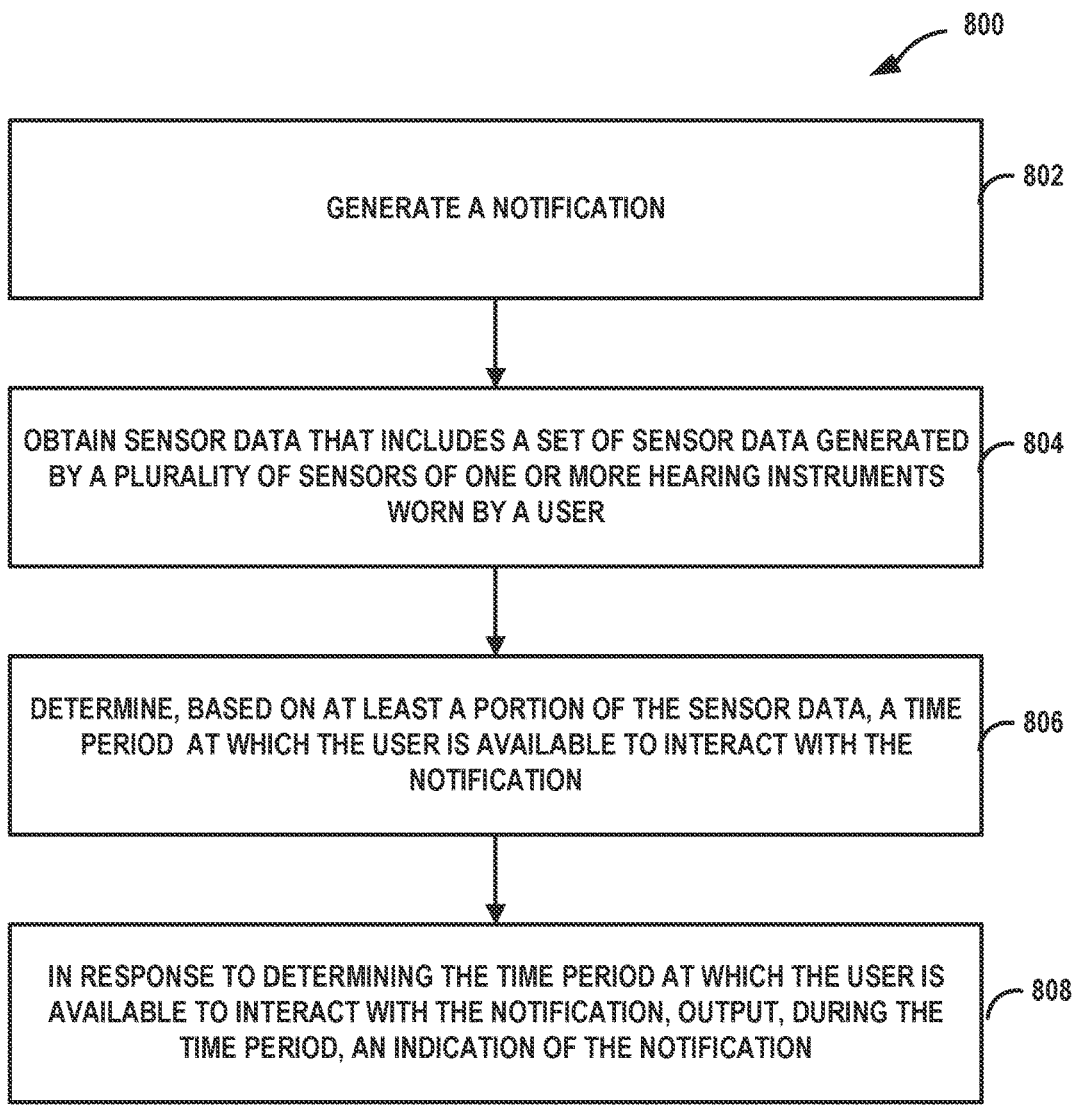
FIG. 8 is a flowchart illustrating an example operation in accordance with one or more techniques described in this disclosure.

FIG. 8 is a flowchart illustrating an example operation 800 in accordance with one or more techniques of this disclosure. Other examples of this disclosure may include more, fewer, or different actions. In some examples, actions in the flowcharts of this disclosure may be performed in parallel or in different orders.

In the example of FIG. 8, one or more processing circuits of one or more processors 208 of hearing instruments 102 or one or more processors 302 of computing device 300 may generate a notification (802). For example, one or more processing circuits of one or more processors 208 of hearing instruments 102 or one or more processors 302 of computing device 300 may generate a reminder to user 104 to stand and stretch, a reminder to user 104 to clean hearing instruments 102, a reminder for user 104 to take medication, a reminder for user 104 to hydrate, and the like.

The one or more processing circuits of one or more processors 208 of hearing instruments 102 or one or more processors 302 of computing device 300 may obtain sensor data that includes a set of sensor data generated by a plurality of sensors 212 of hearing instruments 102 worn by a user 104 (804). For example sensors 212 of hearing instruments 102 may continuously produce a stream of sensor data indicative of the context of user 104 in real time, such as sensor data indicative of the surrounding environment of user 104, sensor data indicative of the motion or activity state of user 104, sensor data indicative of the physiological condition of user 104, and the like. In some examples, the one or more processing circuits of one or more processors 208 of hearing instruments 102 or one or more processors 302 of computing device 300 may obtain sensor data that also includes a set of sensor data generated by a plurality of sensors 350 of computing device 300.

One or more processing circuits of one or more processors 208 of hearing instruments 102 or one or more processors 302 of computing device 300 may determine, based on at least a portion of the sensor data, a time period at which the user 104 is available to interact with the notification (806). One or more processing circuits of one or more processors 208 of hearing instruments 102 or one or more processors 302 of computing device 300 may use the obtained sensor data to continuously monitor the availability of user 104 to interact with the notification in order to determine a time period at which the user 104 is available to interact with the notification.

For example, one or more processing circuits of one or more processors 208 of hearing instruments 102 or one or more processors 302 of computing device 300 may use any combination of data determined from the sensor data, such as the location of user 104, the activity level of user 104, the blood oxygen saturation level of user 104, the cerebral electrical activity of user 104, the body temperature of user 104, the heart rate of user 104, the step count of user 104, audio streamed from one or more microphones 210 of hearing instruments 102, and the like, to continuously determine, for a plurality of time periods, the availability of user 104 to interact with the notification.

In some examples, one or more processing circuits of one or more processors 208 of hearing instruments 102 or one or more processors 302 of computing device 300 may compare one or more of the set of sensor data produced by sensors 350 of computing device 300 with one or more of a set of sensor data produced by sensors 212 of hearing instruments 102 to determine whether the one or more of the set of sensor data produced by sensors 350 of computing device 300 matches the one or more of a set of sensor data produced by sensors 212 of hearing instruments 102. One or more processing circuits of one or more processors 208 of hearing instruments 102 or one or more processors 302 of computing device 300 may in response to determining that the one or more of the set of sensor data produced by sensors 350 of computing device 300 matches the one or more of a set of sensor data produced by sensors 212 of hearing instruments 102, use both the set of sensor data produced by sensors 350 and the set of sensor data produced by sensors 212 to determine the availability of user 104 to interact with a notification during a period of time.

One or more processing circuits of one or more processors 208 of hearing instruments 102 or one or more processors 302 of computing device 300 may in response to determining that the one or more of the set of sensor data produced by sensors 350 of computing device 300 do not match the one or more of a set of sensor data produced by sensors 212 of hearing instruments 102, refrain from using the set of sensor data produced by sensors 350 to determine the availability of user 104 to interact with a notification during a period of time. In some examples, the one or more of the set of sensor data produced by sensors 350 of computing device 300 and the one or more of a set of sensor data produced by sensors 212 of hearing instruments 102 may each be step count values produced by respective step count sensors of sensors 350 and sensors 212.

One or more processing circuits of one or more processors 208 of hearing instruments 102 or one or more processors 302 of computing device 300 may, in response to determining the time period at which the user 104 is available to interact with the notification, output, during the time period, the notification (808). In some examples, one or more processing circuits of one or more processors 208 of hearing instruments 102 or one or more processors 302 of computing device 300 may output the notification at display screen 312 or at, e.g., one or more audio output components of computing device 300. In some examples, one or more processing circuits of one or more processors 208 of hearing instruments 102 or one or more processors 302 of computing device 300 may output the notification at one or more of speakers 108 of one or more of hearing instruments 102.

Aspects of this disclosure include the following examples.

Example 1: A method includes generating, by one or more processing circuits, a notification; obtaining, by the one or more processing circuits, sensor data that includes a set of sensor data generated by a plurality of sensors of one or more hearing instruments worn by a user; determining, by the one or more processing circuits and based on at least a portion of the sensor data, a time period at which the user is available to interact with the notification; and in response to determining the time period at which the user is available to interact with the notification, outputting, by the one or more processing circuits during the time period, the notification.

Example 2: The method of example 1, wherein: obtaining the sensor data that includes the set of sensor data generated by the plurality of sensors of one or more hearing instruments worn by the user further comprises: obtaining, by the one or more processing circuits, the sensor data that includes the set of sensor data generated by the plurality of sensors of one or more hearing instruments worn by the user and a second set of sensor data generated by a second plurality of sensors of a computing device communicably coupled to the one or more hearing instruments; and determining the time period at which the user is available to interact with the notification further comprises: comparing, by the one or more processing circuits, a first one or more of the set of sensor data with a second one or more of the second set of sensor data to determine whether the first one or more of the set of sensor data matches the second one or more of the second set of sensor data; and in response to determining that the first one or more of the set of sensor data matches the second one or more of the second set of sensor data, determining, by the one or more processing circuits and based on the set of sensor data and the second set of sensor data, the time period at which the user is available to interact with the notification.

Example 3: The method of any of examples 1 and 2, wherein: obtaining the sensor data that includes the set of sensor data generated by the plurality of sensors of one or more hearing instruments worn by the user further comprises: obtaining, by the one or more processing circuits, the sensor data that includes the set of sensor data generated by the plurality of sensors of one or more hearing instruments worn by the user and a second set of sensor data generated by a second plurality of sensors of a computing device communicably coupled to the one or more hearing instruments; and determining the time period at which the user is available to interact with the notification further comprises: comparing, by the one or more processing circuits, a first one or more of the set of sensor data with a second one or more of the second set of sensor data to determine whether the first one or more of the set of sensor data matches the second one or more of the second set of sensor data; and in response to determining that the first one or more of the set of sensor data do not match the second one or more of the second set of sensor data, refraining from using the second set of sensor data to determine the time period at which the user is available to interact with the notification.

Example 4: The method of any of examples 2 and 3, wherein the first one or more of the set of sensor data and the second one or more of the second set of sensor data each comprises step count values.

Example 5: The method of any of examples 1-4, further includes prior to the time period at which the user is available to interact with the notification and while the user is not available to interact with the notification, storing, by the one or more processing circuits, the notification in a notification store.

Example 6: The method of example 5, further includes generating, by the one or more processing circuits, a plurality of notifications; storing, by the one or more processing circuits, the plurality of notifications in the notification store while the user is not available to interact with the notification; in response to determining, based on the sensor data, a second time period at which the user is available to interact with one of the plurality of notifications, selecting, by the one or more processing circuits, a second notification out of the plurality of notifications in the notification store; and in response to selecting the second notification, outputting, by the one or more processing circuits during the second time period, an indication of the second notification.

Example 7: The method of example 6, wherein selecting the second notification out of the plurality of notifications in the notification store based at least in part on a priority level associated with the second notification.

Example 8: The method of any of examples 6 and 7, further includes determining, by the one or more processing circuits, that an elapsed time since a third notification of the plurality of notifications in the notification store was generated has exceeded a timeout value associated with the third notification; and in response to determining that the elapsed time since the third notification was generated has exceeded the timeout value associated with the third notification, outputting, by the one or more processing circuits, an indication of the third notification regardless of whether the user is available to interact with the notification.

Example 9: The method of any of examples 1-8, wherein the plurality of sensors and the second plurality of sensors include one or more location sensors, one or more motion sensors, one or more physiological sensors, and one or more microphones.

Example 10: The method of any of examples 1-9, wherein the sensor data includes one or more of environmental information about a surrounding environment of the user, motion information associated with the user, or physiological information associated with the user.

Example 11: The method of any of examples 1-10, wherein the notification indicates an action to be performed by the user.

Example 12: The method of example 11, wherein determining the time period at which the user is available to interact with the notification further comprises determining, by the one or more processing circuits, the time period at which the user is available to perform the action indicated by the notification.

Example 13: The method of any of examples 11 and 12, wherein the notification is a reminder to perform the action.

Example 14: The method of any of examples 1-13, wherein the one or more hearing instruments comprise the one or more processing circuits.

Example 15: The method of any of examples 1-13, wherein the computing device comprises the one or more processing circuits.

Example 16: The method of any of examples 1-15, wherein the computing device comprises a smart phone.

Example 17: The method of any of examples 1-16, wherein the one or more hearing instruments are hearing aids.

Example 18: A computing device includes memory; and processing circuitry operably coupled to the memory and configured to: generate a notification; obtain sensor data that includes a set of sensor data generated by a plurality of sensors of one or more hearing instruments worn by a user; determine, based on at least a portion of the sensor data, a time period at which the user is available to interact with the notification; and in response to determining the time period at which the user is available to interact with the notification, output, during the time period, the notification.

Example 19: The computing device of example 18, wherein: to obtain the sensor data that includes the set of sensor data generated by the plurality of sensors of one or more hearing instruments worn by the user, the processing circuitry is further configured to: obtain the sensor data that includes the set of sensor data generated by the plurality of sensors of one or more hearing instruments worn by the user and a second set of sensor data generated by a second plurality of sensors of the computing device; and to determine the time period at which the user is available to interact with the notification, the processing circuitry is further configured to: compare a first one or more of the set of sensor data with a second one or more of the second set of sensor data to determine whether the first one or more of the set of sensor data matches the second one or more of the second set of sensor data; and in response to determining that the first one or more of the set of sensor data matches the second one or more of the second set of sensor data, determine, based on the set of sensor data and the second set of sensor data, the time period at which the user is available to interact with the notification.

Example 20: The computing device of any of examples 18 and 19, wherein: to obtain the sensor data that includes the set of sensor data generated by the plurality of sensors of one or more hearing instruments worn by the user, the processing circuitry is further configured to: obtain the sensor data that includes the set of sensor data generated by the plurality of sensors of one or more hearing instruments worn by the user and a second set of sensor data generated by a second plurality of sensors of the computing device; and to determine the time period at which the user is available to interact with the notification, the processing circuitry is further configured to: compare a first one or more of the set of sensor data with a second one or more of the second set of sensor data to determine whether the first one or more of the set of sensor data matches the second one or more of the second set of sensor data; and in response to determining that the first one or more of the set of sensor data do not match the second one or more of the second set of sensor data, refrain from using the second set of sensor data to determine the time period at which the user is available to interact with the notification.

Example 21: The computing device of any of examples 19 and 20, wherein the first one or more of the set of sensor data and the second one or more of the second set of sensor data each comprises step count values.

Example 22: The computing device of any of examples 18-21, wherein the processing circuitry is further configured to: prior to the time period at which the user is available to interact with the notification and while the user is not available to interact with the notification, store the notification in a notification store in the memory.

Example 23: The computing device of example 22, wherein the processing circuitry is further configured to: generate a plurality of notifications; store the plurality of notifications in the notification store while the user is not available to interact with the notification; in response to determining, based on the sensor data, a second time period at which the user is available to interact with one of the plurality of notifications, select a second notification out of the plurality of notifications in the notification store; and in response to selecting the second notification, output, during the second time period, an indication of the second notification.

Example 24: The computing device of example 23, wherein selecting the second notification out of the plurality of notifications in the notification store based at least in part on a priority level associated with the second notification.

Example 25: The computing device of any of examples 23 and 24, wherein the processing circuitry is further configured to: determine that an elapsed time since a third notification of the plurality of notifications in the notification store was generated has exceeded a timeout value associated with the third notification; and in response to determining that the elapsed time since the third notification was generated has exceeded the timeout value associated with the third notification, output an indication of the third notification regardless of whether the user is available to interact with the notification.

Example 26: The computing device of any of examples 18-25, wherein the plurality of sensors and the second plurality of sensors include one or more location sensors, one or more motion sensors, one or more physiological sensors, and one or more microphones.

Example 27: The computing device of any of examples 18-26, wherein the sensor data includes one or more of environmental information about a surrounding environment of the user, motion information associated with the user, or physiological information associated with the user.

Example 28: The computing device of any of examples 18-27, wherein the notification indicates an action to be performed by the user.

Example 29: The computing device of example 28, wherein to determine the time period at which the user is available to interact with the notification, the processing circuitry is further configured to determine the time period at which the user is available to perform the action indicated by the notification.

Example 30: The computing device of any of examples 28 and 29, wherein the notification is a reminder to perform the action.

Example 31: The computing device of any of examples 18-30, wherein the computing device comprises a smart phone.

Example 32: The computing device of any of examples 18-31, wherein the one or more hearing instruments are hearing aids.

Example 33: An apparatus includes means for generating a notification; means for obtaining sensor data that includes a set of sensor data generated by a plurality of sensors of one or more hearing instruments worn by a user; means for determining, based on at least a portion of the sensor data, a time period at which the user is available to interact with the notification; and means for, in response to determining the time period at which the user is available to interact with the notification, outputting, during the time period, the notification.

Example 34: The apparatus of example 33, comprising means for performing the methods of any of examples 1-17.

Example 35: A computer-readable medium includes generate a notification; obtain sensor data that includes a set of sensor data generated by a plurality of sensors of one or more hearing instruments worn by a user; determine, based on at least a portion of the sensor data, a time period at which the user is available to interact with the notification; and in response to determining the time period at which the user is available to interact with the notification, output, during the time period, the notification.

Example 36: The computer-readable medium of example 35, wherein the instructions cause the one or more processors to perform the methods of any of examples 1-17.

In this disclosure, ordinal terms such as "first." "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently. e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, cache memory, or any other medium that can be used to store desired program code in the form of instructions or store data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   generating, by one or more processing circuits, a notification;
   obtaining, by the one or more processing circuits, sensor data that includes a first set of sensor data generated by a first plurality of sensors of one or more hearing instruments worn by a user and a second set of sensor data generated by a second plurality of sensors of a computing device communicably coupled to the one or more hearing instruments;
   comparing, by the one or more processing circuits, a first one or more of the first set of sensor data with a second one or more of the second set of sensor data to determine whether the first one or more of the first set of sensor data matches the second one or more of the second set of sensor data based on determining whether values of the first one or more of the first set of sensor data and the second one or more of the second set of sensor data are within a specific threshold, wherein the first one or more of the first set of sensor data and the second one or more of the second set of sensor data are generated by sensors of a same sensor type;
   in response to determining that the first one or more of the first set of sensor data matches the second one or more of the second set of sensor data, determining, by the one or more processing circuits and based on at least a portion of the sensor data, a time period at which the user is available to interact with the notification; and
   in response to determining the time period at which the user is available to interact with the notification, outputting, by the one or more processing circuits during the time period, the notification.

2. The method of claim 1, wherein the values of the first one or more of the first set of sensor data and the second one or more of the second set of sensor data comprise step count values indicative of steps taken by the user.

3. The method of claim 1, further comprising:
   prior to the time period at which the user is available to interact with the notification and while the user is not available to interact with the notification, storing, by the one or more processing circuits, the notification in a notification store.

4. The method of claim 3, further comprising:
   generating, by the one or more processing circuits, a plurality of notifications;
   storing, by the one or more processing circuits, the plurality of notifications in the notification store while the user is not available to interact with the notification;
   in response to determining, based on the sensor data, a second time period at which the user is available to interact with one of the plurality of notifications, selecting, by the one or more processing circuits, a second notification out of the plurality of notifications in the notification store; and
   in response to selecting the second notification, outputting, by the one or more processing circuits during the second time period, an indication of the second notification.

5. The method of claim 4, wherein selecting the second notification out of the plurality of notifications stored in the notification store based at least in part on a priority level associated with the second notification.

6. The method of claim 4, further comprising:
   determining, by the one or more processing circuits, that an elapsed time since a third notification of the plurality of notifications in the notification store was generated has exceeded a timeout value associated with the third notification; and
   in response to determining that the elapsed time since the third notification was generated has exceeded the timeout value associated with the third notification, outputting, by the one or more processing circuits, an indication of the third notification regardless of whether the user is available to interact with the third notification.

7. The method of claim 1, wherein the first plurality of sensors include one or more location sensors, one or more motion sensors, one or more physiological sensors, and one or more microphones.

8. The method of claim 1, wherein the sensor data includes one or more of environmental information about a surrounding environment of the user, motion information associated with the user, or physiological information associated with the user.

9. The method of claim 1, wherein the notification indicates an action to be performed by the user.

10. The method of claim 9, wherein determining the time period at which the user is available to interact with the notification further comprises determining, by the one or more processing circuits, the time period at which the user is available to perform the action indicated by the notification.

11. A computing device comprising:
   memory; and
   processing circuitry operably coupled to the memory and configured to:
      generate a notification;
      obtain sensor data that includes a first set of sensor data generated by a first plurality of sensors of one or more hearing instruments worn by a user and a second set of sensor data generated by a second plurality of sensors of the computing device communicably coupled to the one or more hearing instruments;
      compare a first one or more of the first set of sensor data with a second one or more of the second set of sensor data to determine whether the first one or more of the first set of sensor data matches the second one or more of the second set of sensor data based on determining whether values of the first one or more of the first set of sensor data and the second one or more of the second set of sensor data are within a specific threshold, wherein the first one or more of the first set of sensor data and the second one or more of the second set of sensor data are generated by sensors of a same sensor type;
      in response to determining that the first one or more of the first set of sensor data matches the second one or more of the second set of sensor data, determine, based on at least a portion of the sensor data, a time period at which the user is available to interact with the notification; and
      in response to determining the time period at which the user is available to interact with the notification, output, during the time period, the notification.

12. The computing device of claim 11, wherein the processing circuitry is further configured to:
   prior to the time period at which the user is available to interact with the notification and while the user is not available to interact with the notification, store the notification in a notification store.

13. The computing device of claim 12, wherein the processing circuitry is further configured to:
   generate a plurality of notifications;
   store the plurality of notifications in the notification store while the user is not available to interact with the notification;
   in response to determining, based on the sensor data, a second time period at which the user is available to interact with one of the plurality of notifications, select a second notification out of the plurality of notifications stored in the notification store; and
   in response to selecting the second notification, output, during the second time period, an indication of the second notification.

14. The computing device of claim 13, wherein to select the second notification out of the plurality of notifications in the notification store, the processing circuitry is further configured to:
   select the second notification out of the plurality of notifications in the notification store based at least in part on a priority level associated with the second notification.

15. The computing device of claim 13, wherein the processing circuitry is further configured to:
   determine that an elapsed time since a third notification of the plurality of notifications in the notification store was generated has exceeded a timeout value associated with the third notification; and
   in response to determining that the elapsed time since the third notification was generated has exceeded the timeout value associated with the third notification, output an indication of the third notification regardless of whether the user is available to interact with the third notification.

16. A non-transitory computer-readable storage medium having instructions stored thereon that, when executed, cause a computing system to:
   generate a notification;
   obtain sensor data that includes a first set of sensor data generated by a first plurality of sensors of one or more hearing instruments worn by a user and a second set of sensor data generated by a second plurality of sensors of a computing device communicably coupled to the one or more hearing instruments;
   compare a first one or more of the first set of sensor data with a second one or more of the second set of sensor data to determine whether the first one or more of the first set of sensor data matches the second one or more of the second set of sensor data based on determining whether values of the first one or more of the first set of sensor data and the second one or more of the second set of sensor data are within a specific threshold, wherein the first one or more of the first set of sensor data and the second one or more of the second set of sensor data are generated by sensors of a same sensor type;
   in response to determining that the first one or more of the first set of sensor data matches the second one or more of the second set of sensor data, determine, based on at least a portion of the sensor data, a time period at which the user is available to interact with the notification; and
   in response to determining the time period at which the user is available to interact with the notification, output, during the time period, the notification.

\* \* \* \* \*